United States Patent
Fujiwara et al.

(10) Patent No.: US 6,397,803 B1
(45) Date of Patent: Jun. 4, 2002

(54) VALVE TIMING CONTROL SYSTEM FOR INTERNAL COMBUSTION ENGINE

(75) Inventors: Morio Fujiwara; Atsuko Hashimoto, both of Tokyo; Tatsuhiko Takahashi, Hyogo-ken, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/928,993

(22) Filed: Aug. 15, 2001

(30) Foreign Application Priority Data

Feb. 22, 2001 (JP) ........................... 2001-046506

(51) Int. Cl.[7] .................... F02D 13/02; F01L 1/34
(52) U.S. Cl. ..................... 123/90.15; 123/90.17
(58) Field of Search ................ 123/90.15, 90.16, 123/90.17, 90.18, 90.31

(56) References Cited

U.S. PATENT DOCUMENTS

| | | | | |
|---|---|---|---|---|
| 5,937,808 A | * | 8/1999 | Kako et al. | 123/90.15 |
| 5,957,095 A | * | 9/1999 | Kako | 123/90.15 |
| 6,047,674 A | * | 4/2000 | Kadowaki et al. | 123/90.15 |
| 6,161,511 A | * | 12/2000 | Hashimoto | 123/90.15 |
| 6,170,446 B1 | * | 1/2001 | Hashimoto | 123/90.15 |
| 6,213,070 B1 | * | 4/2001 | Hashimoto et al. | 123/90.15 |
| 9,260,524 | * | 7/2001 | Wachi | 123/90.15 |

FOREIGN PATENT DOCUMENTS

| | | |
|---|---|---|
| JP | 7-233713 | 9/1995 |
| JP | 11-148380 | 6/1999 |
| JP | 2982604 | 9/1999 |

* cited by examiner

Primary Examiner—Weilun Lo
(74) Attorney, Agent, or Firm—Sughrue Mion, PLLC

(57) ABSTRACT

A valve timing control system for an internal combustion engine for improving engine starting performance by controlling an actuator to a lock-up position upon stopping of the engine and fixing the actuator positively at the lock-up position by a locking mechanism. The control system (21A) includes a power supply interruption detecting means (215) for detecting a time point when electric power supply is interrupted, a desired valve timing setting means (213A) for setting a desired valve timing (VTo) on the basis of engine operation state (D), and an actual valve timing control means (214A) for driving the actuator (15, 16) so that the actual valve timing (VTA) coincides with the desired valve timing (VTo). An oil supply means (19, 20) for supplying a hydraulic pressure to the actuator is controlled over a predetermined time period from the power supply interruption time point in response to a result of detection of the power supply interruption detecting means (215) for thereby allowing the actuator (15, 16) to be retained at the lock-up position.

13 Claims, 14 Drawing Sheets

VALVE TIMING CONTROL SYSTEM FOR INTERNAL COMBUSTION ENGINE

BACKGROUND OF THE INVENTION

1. Field of the Invention

The present invention generally relates to a valve timing control apparatus or system for an internal combustion engine which system is designed for controlling open/close timings of intake valves and exhaust valves of the engine in dependence on operation states or modes thereof. More particularly, the invention is concerned with a valve timing control system for an internal combustion engine which system is designed for controlling an actuator so that it is fixedly set to a lock-up position by means of a locking mechanism when the engine is started or stopped, for thereby preventing or suppressing generation of noise as well as occurrence of engine stall event to ensure an improved starting performance of the engine.

2. Description of Related Art

In recent years, in the industrial field of internal combustion engines for the motor vehicles and others, there has been proposed and developed for practical applicants a valve timing control system which is designed to variably control the open/close timing for at least one of the intake valve and the exhaust valve in dependence on the engine operation state with a view to enhancing the engine output performance and reducing the exhaust gas while ensuring improvement engine control performance.

In the system of this type, there is provided a hydraulic pressure type actuator(s) for changing positions of a cam shaft(s) relative to a crank shaft of the engine for controllably sustaining an optimum valve timing.

The actuator includes a locking mechanism for locking the actuator at an intermediate or mid position between the positions corresponding to the most advanced timing and the most retarded timing, respectively, upon starting of the engine operation while allowing the valve timing control to be performed in dependence on the operation state of the engine after having been started.

The variable valve timing mechanism (also referred to as the VVT mechanism in short) which includes the actuator mentioned above is further comprised of a vane assembly disposed rotatably within a housing for changing the phase or angular position of the cam shaft which drives the intake valve or the exhaust valve. In this conjunction, description concerning the vane assembly will be made in detail later on.

At this juncture, it should however be mentioned that in the engine starting operation mode, the vane assembly of the variable valve timing mechanism is held substantially at a mid position (i.e., the position corresponding to the start position) for regulating the relative rotation (or angular displacement) of the cam shaft relative to the crank shaft and releasing the regulation when a predetermined time has lapsed since the start of the engine.

For having better understanding of the concept underlying the present invention, description will first be made in some detail of a hitherto known or conventional valve timing control system for an internal combustion engine. FIG. 7 of the accompanying drawings is a functional block diagram showing generally and schematically a configuration of a conventional valve timing control system for an internal combustion engine disclosed, for example, in Japanese Patent Application Laid-Open No. 324613/1997 (JP-A-9-324613) and Japanese Patent Application Laid-Open No. 148380/1999 (JP-A-11-148380), etc.

Parenthetically, it is presumed, only by way of example, that the valve timing control system shown in FIG. 7 is so arranged as to variably control the open/close timings of both the intake valve and the exhaust valve.

Referring to FIG. 7, disposed within a cylinder 1 which constitutes a major part of an engine (hereinafter also referred to as the engine cylinder or simply as the engine 1) is a piston 1P reciprocatably therein. A crank shaft 13C serving as an output shaft of the engine is operatively coupled to the piston 1P.

The intake air supplied through an intake pipe 4 is charged into a combustion chamber defined within the engine cylinder 1 by way of an air cleaner 2. An air-flow sensor 3 is disposed in the intake pipe 4 at a position downstream of the air cleaner 2.

Further installed in the intake pipe 4 are a throttle valve 5, an idle speed control valve (also referred to simply as the ISCV in short) 6 and a fuel injector 7.

The air cleaner 2 is designed to purify the intake air fed into the combustion chamber within the engine cylinder. The air flow sensor 3 is designed to measure the quantity or flow rate of the intake air at a position upstream of the throttle valve 5.

The throttle valve 5 is designed to regulate the amount or flow rate of the intake air flowing through the intake pipe 4 for controlling the output power or torque of the engine 1.

On the other hand, the idle speed control valve 6 is designed to adjust the intake air flow which bypasses the throttle valve 5 when it is closed, to thereby control the engine rotation speed (rpm) in the idling mode of the engine.

The fuel injector 7 is designed to inject into the intake pipe 4 an amount of fuel which conforms to the flow rate of the intake air.

Additionally, provided internally of the combustion chamber of the engine cylinder 1 is a spark plug 8 designed to produce a spark discharge for triggering combustion of the air-fuel mixture charged in the combustion chamber defined within the cylinder by making use of electric power of high voltage supplied from the ignition coil 9.

An exhaust pipe 10 is provided for discharging an exhaust gas which results from the combustion of the air-fuel mixture within the engine cylinder.

The engine 1 is equipped with an intake valve V1 and an exhaust valve V2. The timing at which the intake pipe 4 and the exhaust pipe 10 are put into mutual communication are determined by the intake valve V1 and the exhaust valve V2. On the other hand, the timings for driving the respective valves V1 and V2 are determined by the cam shafts 15C and 16C each of which rotates at a speed equal to a half of that of the crank shaft 13C.

An $O_2$-sensor 11 and a catalytic converter 12 are disposed in the exhaust pipe 10. The $O_2$-sensor 11 serves for detecting the content of residual oxygen contained in the exhaust gas.

The catalytic converter (or catalyst) 12 is constituted by a three-way catalytic converter known by itself and serves for eliminating simultaneously harmful gas components such as HC (hydrocarbon), CO (carbon monoxide) and $NO_x$ (nitrogen oxides) contained in the exhaust gas.

A sensor plate 13 designed for detecting the crank angle is mounted on the crank shaft 13C of the engine so as to corotate therewith. The sensor plate 13 is provided with a projection (not shown) at a predetermined crank angle in the outer periphery of the plate.

A crank angle sensor 14 is installed at a position close to the outer periphery of the sensor 13 and diametrically opposite thereto for detecting the angular position of the crank shaft 13C in cooperation with the sensor plate 13. Thus, the crank angle sensor 14 can generate an electric signal indicative of the rotational position of the crank shaft 13C (i.e., the pulse-like crank angle signal) every time the projection of the sensor plate 13 passes by the crank angle sensor 14. In this way, the rotational position or angular position (i.e., crank angle) of the crank shaft 13C can be detected.

Actuators 15 and 16 are provided for the purpose of changing individually and continuously the cam angle phases (intake and exhaust valve timings) of the cam shafts 15C and 16C relative to the crank shaft 13C.

In more concrete, each of the actuators 15 and 16 is comprised of a retarding hydraulic chamber and an advancing hydraulic chamber partitioned from each other, as will be described later on, for changing the rotational or angular positions (phases) of the cam shafts 15C and 16C, respectively, relative to the crank shaft 13C.

Cam angle sensors 17 and 18 are disposed at positions diametrically opposite to the outer periphery of cam angle detecting sensor plates (not shown) with the aim of detecting the angular positions of the cams (i.e., cam angles or phases) in cooperation with the associated sensor plates. More specifically, each of the cam angle sensors 17 and 18 is designed to generate a pulse signal indicative of the cam angle (i.e., the cam angle signal) in response to a projection formed in the outer periphery of the associated cam angle detecting sensor plate in a similar manner as the crank angle sensor 14 described previously. In this way, it is possible to detect the cam angles (or cam phases) and hence the angular positions of the cam shafts.

Oil control valves (hereinafter also referred to as the OCV in short) 19 and 20 constitute an oil supply means in cooperation with oil pumps (not shown) and serve for regulating the hydraulic pressures supplied to the individual actuators 15 and 16 for controlling the cam angle phases (valve timings), respectively.

Further, the oil control valves 19 and 20 which constitute parts of the variable valve timing mechanism together with the actuators 15 and 16 are each composed of a linear solenoid valve for controlling the hydraulic pressure supplied to the actuator 15; 16.

An electronic control unit (also referred to simply as the ECU) 21 which may be constituted by a microcomputer or microprocessor serves as a control means for performing overall control of the internal combustion engine system. Thus, the ECU 21 is in charge of controlling the fuel injectors 7 and the spark plugs 8 as well as the angular positions or rotational phases of the cam shafts 15C and 16C in dependence on the engine operation states detected by the various sensors such as the air-flow sensor 3, the $O_2$-sensor 11, the crank angle sensor 14 and the cam angle sensors 17 and 18.

Further provided in association with the throttle valve 5 is a throttle position sensor (not shown in the figure) for detecting the opening degree of the throttle valve. Furthermore, a water temperature sensor is provided for detecting the temperature of engine cooling water. The throttle opening degree and the cooling water temperature as detected are also supplied to the ECU 21 as the information indicative of the operation state of the engine 1 similarly to the various sensor information mentioned above.

FIG. 8 is a functional block diagram showing, by way of example, a structure of the ECU 21.

Referring to FIG. 8, the ECU 21 includes an engine operation state detecting means 211, an actual valve timing detecting means 212, a desired valve timing setting means 213, an actual valve timing control means 214, a power supply interruption detecting means 215, a hold control means 216 and a change-over means 217.

The engine operation state detecting means 211 is designed to detect the operation state of the engine on the basis of the engine rotation speed (rpm) derived from the output of the crank angle sensor 14 (see FIG. 7) and the detection information acquired from the other sensors (e.g. throttle position sensor, pressure sensor, water temperature sensor, etc.).

The actual valve timing detecting means 212 is designed to detect an actual valve timing VTA of at least one of the intake valve V1 and the exhaust valve V2 on the basis of the detection signal outputted from the cam angle sensor 17; 18.

The desired valve timing setting means 213 is designed to arithmetically determined an optimal desired or target valve timing VTo for at least one of the intake valve V1 and the exhaust valve V2 in dependence on the engine operation state D.

In that case, the optimal desired valve timing VTo can easily be established or set in dependence on the engine operation state D by preparing in advance, for example, a two-dimensional data table or map containing the valve timing values obtained experimentarily in correspondence to the engine rotation speeds (rpm) and the engine loads (serving as parameters) and storing the map in a read-only memory (ROM) incorporated in the ECU 21.

The actual valve timing control means 214 is so designed as to perform a feedback control so that deviation or difference between the desired valve timing VTo and the actual valve timing VTA assumes zero (i.e., VTo=VTA) while generating a control quantity (linear solenoid current) for the oil control valve 19; 20.

The power supply interruption detecting means 215 is designed to detect an off-state of the ignition switch (i.e., the state where the power supply is interrupted with the engine operation being stopped).

The hold control means 216 is designed to operate the oil control valve 19; 20 over a predetermined time from the time point when the power supply interruption was detected by the power supply interruption detecting means 215 to thereby control the oil control valve 19; 20 to a hold position so that the hydraulic pressure for the actuator can be sustained or held.

The change-over means 217 is designed to change over the control of the oil control valve 19; 20 between an ordinary control performed by the actual valve timing control means 214 when the power supply to the engine system is turned on and a control performed by the hold control means 216 when the power supply to the engine system is turned off or interrupted.

Incidentally, the ECU 21 is so designed as to make decision on the basis of the result of time measurement by a timer as to whether or not a predetermined time has lapsed since the time point when the power supply was interrupted (i.e., after turn-off of the ignition switch). When it is decided that the predetermined time has lapsed, a main relay is opened.

The actuator 15; 16 is driven by the oil control valve (oil supply means) 19; 20, as described previously, to thereby change an open/close timing of at least one of the intake valve V1 and the exhaust valve V2.

Next, by reference to FIGS. 9 and 10, description will be made in concrete of the phase angle control operation for the cam shaft 15C; 16C in the conventional valve timing control system for the internal combustion engine.

FIG. 9 is a view for illustrating relation between the crank angle [CA] and the valve lift stroke [mm] indicating the valve opening degree (hereinafter also referred to as the valve opening quantity). In the figure, the top dead center in the compression stroke of the cylinder is designated by reference symbol TDC.

In FIG. 9, a single-dotted broken line curve represents a change of the valve lift quantity when the valve operation timing is set to a most retarded position delimited mechanically, a broken line curve represents a change of the valve lift quantity when the valve operation timing is set to a most advanced position delimited mechanically, and a solid line curve represents a change of the valve lift quantity in a lock-up state where the valve operation timing is locked by a locking mechanism which will be described hereinafter.

Referring to FIG. 9, it is to be noted that the peak position of the valve lift quantity on the retard side (right-hand side as viewed in the figure) with reference to the top dead center (TDC) corresponds to the fully opened position of the intake valve V1 while the peak position of the valve lift quantity on the advance side (left-hand side as viewed in the figure) corresponds to the fully opened position of the exhaust valve V2.

Accordingly, difference in the crank angle between the peaks on the retard side and the advance side (i.e., difference between the single-dotted line curve and the broken line curve) represents the range within which the valve operation timing can be changed (i.e., the valve operation timing variable range). To say in another way, the valve operation timing or valve timing in short can be varied within the crank angle range defined between the broken line curve and the single-dotted line curve in either the suction or exhaust phase.

FIG. 10 is a timing chart for illustrating timing or phase relations between the output pulse signal of the crank angle sensor 14 on one hand and that of the cam angle sensor 17; 18 on the other hand. More specifically, shown in FIG. 10 are the output pulse signals of the cam angle sensor 17; 18 when the valve timing is most retarded and when the valve timing is most advanced, respectively, relative to the output pulse signal of the crank angle sensor 14.

Referring to FIG. 10, the phase difference between the output signals of the cam angle sensor and the crank angle sensor when the valve timing is at the most advanced position (see the broken line curve shown in FIG. 9) is indicated by "A", whereas the phase difference between the output signals of the cam angle sensor and the crank angle sensor when the valve timing is at the most retarded position (see the single-dotted line curve shown in FIG. 9) is indicated by "B".

In this conjunction, it should be added that the phase position of the output signal of the cam angle sensor 17; 18 relative to the output signal of the crank angle sensor 14 indicating the crank angle position differs in dependence on the position at which the cam angle sensor 17; 18 is mounted.

At this juncture, it should further be mentioned that retarding of the valve timing means that the valve opening start timings of both the valves V1 and V2 are retarded relative to the crank angle (i.e., shifted from the position indicated by the solid line curve toward the single-dotted broken line curve in FIG. 9).

By contrast, advancing of the valve timing means that the valve opening start timings of both the valves V1 and V2 are advanced relative to the crank angle (i.e., shifted from the position indicated by the solid line curve toward the broken line curve in FIG. 9).

Consequently, by performing a feedback control for the variable valve timing mechanism (including the actuator 15; 16, and the oil control valve 19; 20) so that the phase difference as detected coincides with the desired value, the open start timings of the valves V1 and V2 are controlled or set to a given retarded or advanced position within the valve timing variable range (i.e., the range from the broken line curve to the single-dot line curve) shown in FIG. 9.

Parenthetically, the oil control valve 19; 20 includes a spool for changing over the hydraulic passage to the actuator 15 or 16 and a coil for controlling the position of the spool (described later on). When electrically energized in response to a control signal generated by the actual valve timing control means 214, the oil control valve 19; 20 changes over the hydraulic passage to the actuator 15 or 16 for regulating the oil quantity (i.e., hydraulic pressure), to thereby drive the actuator 15 or 16.

Next, by reference to FIGS. 11 to 19, description will be made of internal structures of the variable valve timing mechanism including the actuator 15; 16 and the oil control valve 19; 20.

At first, by reference to FIGS. 11, 12 and 13, the internal structure of the actuator 15; 16 will be described.

FIGS. 11 to 13 are schematic views showing internal structures of the actuators 15 and 16 which can be implemented substantially identical with each other.

Accordingly, the following description will be representatively made of the actuator 15 in association with the cam shaft 15C for the intake valve.

More specifically, FIG. 11 shows the actuator (15; 16) in a state where the cam phase is adjusted to the most retarded position (corresponding to the state indicated by the single-dotted line curve in FIG. 9), FIG. 12 shows the actuator in the state where the cam phase is adjusted to the locked or lock-up position (corresponding to the state indicated by the solid line curve in FIG. 9), and FIG. 13 shows the actuator in the state where the cam phase is adjusted to the most advanced position (corresponding to the state indicated by the broken line curve in FIG. 9).

Referring to FIGS. 11, 12 and 13, the actuator 15 is comprised of a housing 151 which is rotatable together with the rotor 150 in the direction indicated by an arrow, a vane assembly 152 which is rotatable together with the housing 151, retarding hydraulic chambers 153 and advancing hydraulic chambers 154 both defined internally of the housing 151, a lock pin 155 and a spring 156 which are provided within the housing 151, and a locking recess 157 formed in the vane assembly 152.

Driving power or torque is transmitted to the housing 151 from the crank shaft 13C through the medium of a belt/pulley transmission (not shown) with the rotation speed being reduced by a factor of ½.

The position (phase position) of the vane assembly 152 which is connected to the cam shaft 15C is caused to shift within the housing 151 in response to the hydraulic pressure supplied selectively from the oil control valve (OCV) 19 to the retarding hydraulic chamber 153 or the advancing hydraulic chamber 154, whereby the valve timing is changed.

The range of operation (hereinafter also referred to as the operation range) of the vane assembly 152 is defined or delimited by the retarding hydraulic chamber 153 and the advancing hydraulic chamber 154. The retarding hydraulic chamber 153 serves for rotating the vane assembly 152 in the retarding direction (i.e., toward the retarded position) while the advancing hydraulic chamber 154 serves for rotating the vane assembly 152 in the advancing direction (i.e., toward the advanced position).

In the engine starting operation mode, the rotation speed of the oil pump is not sufficiently high. Consequently, the volume of the oil fed to the actuator 15 is also insufficient for effectuating the control of setting the valve timing to the advanced position by controlling the hydraulic pressure. Even in that case, fluttering of the vane assembly 152 due to shortage of the hydraulic pressure can be prevented by virtue of the arrangement that the lock pin 155 is received within the locking recess 157, as illustrated in FIG. 12.

The spring 156 resiliently urges the lock pin 155 in the protruding direction while the locking recess 157 is formed at a predetermined vane assembly lock-up position so that the recess 157 faces in opposition to the tip end of the lock pin 155.

When the actuator 15 is at the lock-up position and when the engine 1 is in the state where the engine rotation speed is low or the engine is stopped, the hydraulic pressure becomes equal to or lower than the level at which the lock pin 155 is released. In that case, the lock pin 155 engages with the locking recess 157 to thereby fix the actuator 15 at a given lock-up position.

The oil control valve (OCV) 19 is in charge of selecting either the retarding hydraulic chamber 153 or the advancing hydraulic chamber 154 for the oil supply.

For changing the cam angle phase of the actuator 15 in such manner as illustrated in FIGS. 11 to 13, the amount of oil (i.e., hydraulic pressure) fed to the actuator 15 is controlled.

By way of example, regulation of the cam angle phase to the most retarded position, as illustrated in FIG. 11, can be realized by feeding oil into the retarding hydraulic chamber 153. On the contrary, regulation of the cam angle phase to the most advanced position, as illustrated in FIG. 13, can be effectuated by feeding lubricant oil into the advancing hydraulic chamber 154.

Next, by reference to FIGS. 14 to 19, description will be directed to internal structures of the oil control valves 19 and 20.

FIGS. 14, 15 and 16 show schematically in side-elevational sectional views the internal structures of the oil control valves 19 and 20 which can be implemented in a substantially identical structure.

Further, FIGS. 17 to 19 are sectional views showing a conventional variable valve timing mechanism. In these figures, there are illustrated interconnections of the oil passages between the actuator 15 described previously by reference to FIGS. 11 to 13 and the oil control valve 19 described above in conjunction with FIGS. 14 to 17.

In the following, description will be directed to the control operation by paying attention to the operations of the actuator 15 and the oil control valve 19 for the intake valve representatively.

Referring to FIGS. 14 to 16, the oil control valve (OCV) 19 is comprised of a cylindrical valve housing 191, a spool 192 slideably disposed within the valve housing 191, a coil (linear solenoid) 193 for driving arbitrarily the spool 192 and a compression spring (return spring) 194 for resiliently urging the spool 192 in the restoring direction.

The coil 193 allows the spool 192 to be operated against the urging efforts of the spring 194.

The valve housing 191 is provided with an oil supply port 195 which is hydraulically communicated to a pump (not shown), an A-port 196 and a B-port 197 hydraulically connected to the actuator 15, and drain ports 198 and 199 for discharging oil.

The A-port 196 is hydraulically communicated to the retarding hydraulic chamber 153 of the actuator 15 (or alternatively to the advancing hydraulic chamber 154 of the actuator 16). On the other hand, the B-port 197 is hydraulically communicated to the advancing hydraulic chamber 154 of the actuator 15 (or alternatively to the retarding hydraulic chamber 153 of the actuator 16).

FIG. 14 shows the state in which the electric current flowing through the solenoid or coil 193 is at a minimum value and thus the spring 194 is stretched or relaxed to a maximum extent. In that case, the actuator 15 assumes the state illustrated in FIG. 11.

FIG. 15 shows the state corresponding to the valve timing control end position or lock-up position (e.g. intermediate or mid position). In this state, the vane assembly 152 of the actuator 15 is at a given desired position or assumes the state illustrated in FIG. 12.

On the other hand, FIG. 16 shows the state in which the electric current flowing through the coil 193 is of a maximum value and thus the spring 194 is compressed to a minimum length. In that case, the actuators 15 is in the state illustrated in FIG. 13.

FIGS. 17 to 19 are views for illustrating operation states of the oil control valve (OCV) 19 in the case where the control current values supplied from the ECU 21 differ.

Referring to FIGS. 17, 18 and 19, the A-port 196 of the oil control valve 19 is hydraulically communicated to the retarding hydraulic chamber 153 of the actuator 15 through a first oil passage 42 while the B-port 197 of the oil control valve 19 is hydraulically communicated to the advancing hydraulic chamber 154 of the actuator 15 through a second oil passage 43.

The rotor 150 of the actuator 15 is adapted to move relative to the housing 151 when the volumes of the retarding hydraulic chamber 153 and the advancing hydraulic chamber 154 change in dependence on the amount of the oil fed from the oil control valve 19 to the retarding hydraulic chamber 153 or the advancing hydraulic chamber 154.

FIG. 17 shows the state where the control current value is of 0.1 A (<0.5 A which represents a reference value). This state corresponds to the actuator state shown in FIG. 11 and the valve state shown in FIG. 14.

Referring to FIG. 17, the spool 192 is resiliently urged toward the left end of the valve housing 191 (toward the right side in FIG. 14) by means of the spring 194. In this state, the oil supply port 195 is hydraulically communicated to the A-port 196 with the B-port 197 being hydraulically communicated to the drain port 199, as indicated by arrows.

In the state described above, oil is fed to the retarding hydraulic chamber 153 of the actuator 15 for the intake valve while oil is discharged from the advancing hydraulic chamber 154. Thus, the rotor 150 is rotated counterclockwise relative to the housing 151 (refer to the arrows shown in FIG. 17).

Consequently, the phase of the cam shaft 15C for the intake valve is retarded relative to the timing pulley for the intake valve, whereby the intake valve V1 is placed in the retarding control state.

On the other hand, the situation reverse to the above prevails for the exhaust valve (not shown). In other words, oil flows into the advancing hydraulic chamber 154 of the actuator while being discharged from the retarding hydraulic chamber 153. Thus, the phase of the cam shaft 16C for the exhaust valve is advanced relative to the timing pulley for the exhaust valve.

FIG. 18 shows the state where the control current value is of 0.5 A (which is equal to the reference value). This state corresponds to the actuator state shown in FIG. 12 and the valve state shown in FIG. 15.

Referring to FIGS. 15 and 18, the forces of the coil 193 and the spring 194 which are in opposition are mutually balanced, whereby the spool 192 is kept at the position where both the A-port 196 and the B-port 197 are closed.

Thus, the retarding hydraulic chamber 153 and the advancing hydraulic chamber 154 are in the state where the oil feeding/discharge operation are disabled. Consequently, unless oil leaks from the retarding hydraulic chamber 153 or the advancing hydraulic chamber 154, the rotor 150 is held at the current position with the phase relation between the timing pulley for the intake valve and the cam shaft 15C for the intake valve are held as they are.

In the state where the actual valve timing does not change as illustrated in FIG. 18, the oil leakage and the amount of oil fed under pressure from the oil pump can balance with each other at only one value of the linear solenoid current, which value will change together with the oil discharge pressure as the engine rotation speed (rpm) and the temperature change.

FIG. 19 shows the state where the control current is of a maximum value of 1.0 A (>0.5 A which represents the reference value). This state corresponds to the actuator state shown in FIG. 13 and the valve state shown in FIG. 16.

Referring to FIG. 19, the spool 192 is moved to the right end of the valve housing 191 (toward the left side as viewed in FIG. 16) by means of the coil 193. In this state, the oil supply port 195 is hydraulically communicated to the B-port 197 with the A-port 196 being hydraulically communicated to the drain port 198, as indicated by arrows.

In this state, oil is fed through the second oil passage 43 to the advancing hydraulic chamber 154 of the actuator 15 for the intake valve while being discharged from the retarding hydraulic chamber 153 through the first oil passage 42. Consequently, the rotor 150 is caused to rotate clockwise relative to the housing 151 (refer to the arrows shown in FIG. 19).

As a result of this, the phase of the cam shaft 15C for the intake valve is caused to advance relative to the timing pulley for the intake valve, whereby the intake valve V1 is placed to the advancing control state.

On the other hand, on the exhaust valve side, oil flows into the retarding hydraulic chamber 153 of the actuator 15 while being discharged from the advancing hydraulic chamber 154. Thus, the phase of the cam shaft 16C for the exhaust valve is controlled to be retarded.

Referring to FIGS. 14 to 19, degree of the hydraulic communication between the oil supply port 195 and the A-port 196 or alternatively the B-port 197 as well as degree of the hydraulic communication between the drain port 198 or 199 and the A-port 196 or B-port 197 are controlled in dependence on the position of the spool 192. In this conjunction, it should be mentioned that the position of the spool 192 is in a proportional relation to the current value of the coil 193.

Furthermore, it should be added that by virtue of the oils passage arrangement described above in conjunction with FIGS. 14 to 19, the valve overlap can be sustained to be minimum, advantageously for enhancing the engine stall withstanding capability, even when failure such as deenergization due to wire breakage should occur in either the oil control valve 19 for the intake valve or the oil control valve 20 for the exhaust valve.

Incidentally, the linear solenoid current at which the actual valve timing undergoes no change, as shown in FIG. 18, is generally referred to as the hold current HLD.

In the actual control, such feedback control is performed on the basis of the hold current HLD that deviation or difference ΔVT between the desired valve timing VTo and the actual valve timing VTA become "0" (zero).

For example, when the valve timing deviation or difference ΔVT (=VTo−VTA) for the intake valve is greater than zero, the linear solenoid current (control quantity) CNT is set to a value which is greater than the hold current HLD in order to advance the actual valve timing VTA.

By contrast, when the timing deviation or difference ΔVT is smaller than zero, the linear solenoid current CNT is set to a value which is smaller than the hold current HLD in order to retard the actual valve timing VTA.

Further, for advancing the valve timing for the exhaust valve, the linear solenoid current CNT is set to a value which is smaller than the hold current HLD while for retarding the valve timing for the exhaust valve the linear solenoid current is set to a value which is greater than the hold current HLD, contrarily to the control for the intake valve.

The ECU 21 is designed to decrease the current flowing through the coil 193 as the timing difference ΔVT reaches zero so that the spool 192 can approach the position shown in FIGS. 15 and 18. At the time point when the timing difference ΔVT becomes equal to zero, the ECU 21 regulates the current flowing through the coil 193 to thereby block the passages to the retarding hydraulic chamber 153 and the advancing hydraulic chamber 154 of the actuator 15

Incidentally, in the conventional valve timing control system disclosed in Japanese Patent Application Laid-Open No. 148380/1999 (JP-A-11-148380), the oil control valve 19; 20 is so controlled that the hydraulic pressure applied to the actuator 15; 16 is held over a predetermined time period after stopping of the engine.

More specifically, by controlling the oil control valve 19; 20, oil pooled in the actuator is held to thereby sustain the hydraulic pressure.

However, in the engine starting operation, the rotor 150 in the actuator 15; 16 may undesirably be moved toward the advanced position under the effect of the rotatory inertia of the crank shaft 13C and the spring force of the cam shaft 15C; 16C.

As a result, the rotor 150 can not be held at the most retarded position, rending it impossible to perform the cam angle control over a period up to the time point when oil is fed to the actuator 15; 16 from the oil pump. Besides, hunching phenomenon of the rotor 150 may occur upon starting of the engine, being accompanied with generation of noise.

As is apparent from the foregoing, the conventional valve timing control system for the internal combustion engine suffers a problem that the rotor 150 of the actuator 15; 16 may unwantedly be shifted toward the advanced position without being held at the most retarded position in the engine starting operation although the hydraulic pressure is sustained for holding the oil control valve 19; 20 upon stopping of the engine, which makes it impossible to carry out the cam angle control until oil supply to the actuator 15; 16 is enabled. Besides, rotor hunching phenomenon takes place upon engine starting operation, incurring noise generation to another disadvantage.

SUMMARY OF THE INVENTION

In the light of the state of the art described above, it is an object of the present invention to provide a valve timing control system for an internal combustion engine, which system is effectively capable of suppressing occurrence of engine stall event as well as generation of noise upon starting of engine operation by controlling an actuator so that it can positively be fixed at a lock-up position upon stopping or starting of the engine operation by employing a locking mechanism capable of locking the actuator at a given position.

In view of the above and other objects which will become apparent as the description proceeds, there is provided according to a first aspect of the present invention a valve timing control system for an internal combustion engine, which system includes a sensor means for detecting operating states of an internal combustion engine, an intake valve driving cam shaft and an exhaust valve driving cam shaft for driving intake and exhaust valves, respectively, of the internal combustion engine in synchronism with rotation of a crank shaft of the engine, an actuator means operatively connected to at least one of the intake valve driving cam shaft and the exhaust valve driving cam shaft for changing open/close timings of the relevant valve(s), an actual valve timing detecting means for detecting an actual valve timing of at least one of the intake and exhaust valves, an oil supply means for supplying a hydraulic pressure for driving the actuator means, a locking mechanism for retaining the actuator means at a lock-up position within a driving range within which the actuator means can be driven, an unlocking mechanism for releasing the locking mechanism in response to a predetermined hydraulic pressure supplied from the oil supply means, and a control means for controlling the hydraulic pressure supplied from the oil supply means to the actuator means in dependence on the operating states of the internal combustion engine to thereby change a relative phase of the cam shaft relative to the crank shaft. In the system described above, the control means is comprised of a power supply interruption detecting means for detecting a time point when electric power supply is interrupted upon stoppage of the engine, a desired valve timing setting means for setting a desired valve timing on the basis of the engine operation state, and an actual valve timing control means for driving the actuator means so that the actual valve timing coincides with the desired valve timing, wherein the actual valve timing control means is so designed as to control the oil supply means over a predetermined time period extending from the power supply interruption time point in response to a result of detection of the power supply interruption detecting means for thereby allowing the actuator means to be retained at the lock-up position.

By virtue of the arrangement of the valve timing control system described above, malfunction involved in the engine starting operation can positively be prevented with the engine starting performance being thus improved and enhanced owing to the feature that the actuator can be fixed at the lock-up position without fail upon stoppage of the engine.

In a preferred mode for carrying out the invention, the actual valve timing control means of the valve timing control system according to the first aspect of the invention may be so designed as to hold the actuator at the lock-up position by performing a feedback control.

Owing to the feature described above, there can be realized the valve timing control system for the internal combustion engine, which can ensure that the actuator is positively set fixedly at the lock-up position.

In another preferred mode for carrying out the invention, the desired valve timing setting means of the valve timing control system to the first aspect of the invention may be so designed as to set the desired valve timing at the lock-up position in response to the result of detection of the power supply interruption detecting means.

With the arrangement of the valve timing control system described above, malfunction in the engine starting operation can be excluded with a simplified structure.

In yet another preferred mode for carrying out the invention, the actual valve timing control means of the valve timing control system according to the first aspect of the invention may be so designed that unless the actuator is retained at the lock-up position upon engine starting, the actual valve timing control means controls the oil supply means for realizing a maximum flow on the advanced side over a predetermined time period extending from a time point at which the engine is started, to thereby retain the actuator at the lock-up position.

With the arrangement of the valve timing control system described above, the actuator can be so controlled as to be positively fixed at the lock-up position upon starting of the engine.

In still another preferred mode for carrying out the invention, the predetermined time period mentioned above may correspond to a period extending from an operation starting time point of the engine to a time point at which rotation speed (rpm) of the engine reaches a predetermined rotation speed (rpm).

With the arrangement of the valve timing control system described above, the actuator can be so controlled as to be positively fixed at the lock-up position upon starting of the engine with the control overhead as involved being reduced to a necessary minimum.

According to a second aspect of the present invention, there is provided a valve timing control system for an internal combustion engine, which system includes a sensor means for detecting operating states of an internal combustion engine, an intake valve driving cam shaft and an exhaust valve driving cam shaft for driving intake and exhaust valves, respectively, of the internal combustion engine in synchronism with rotation of a crank shaft of the engine, an actuator means operatively connected to at least one of the intake valve driving cam shaft and the exhaust valve driving cam shaft for changing open/close timings of the relevant valve(s), an actual valve timing detecting means for detecting an actual valve timing of at least one of the intake and exhaust valves, an oil supply means for supplying a hydraulic pressure for driving the actuator means, a locking mechanism for retaining the actuator means at a lock-up position within a driving range within which the actuator means can be driven, an unlocking mechanism for releasing the locking mechanism in response to a predetermined hydraulic pressure supplied from the oil supply means, and a control means for controlling the hydraulic pressure supplied from the oil supply means to the actuator means in dependence on the operating states of the internal combustion engine to thereby change a relative phase of the cam shaft relative to the crank shaft. In the system described above, the control means is comprised of a power supply interruption detecting means for detecting a time point when electric power supply is interrupted upon stoppage of the engine, a desired valve timing setting means for setting a desired valve timing on the basis of the engine operation state, and an actual valve timing control means for driving the actuator means so that the actual valve timing coincides with the desired valve timing, wherein the control means is further comprised of a lock-up position control means for controlling the oil supply means so as to hold the actuator means at the lock-up position, and a change-over means for changing over control of the oil supply means in response to result of detection of the power supply interruption detecting means, and wherein the change-over means is designed to select an ordinary control performed by the actual valve timing control means upon power-on of the engine while selecting a lock-up position control performed by the lock-up position control means upon interruption of power supply to the engine to thereby hold the actuator means at the lock-up position over a predetermined time period from the power supply interruption time point.

By virtue of the arrangement of the valve timing control system according to the second aspect of the invention the actuator can be positively fixed at the lock-up position upon starting of the engine, whereby malfunctions possibly involved in starting the engine operation can be avoided, whereby the starting performance of the engine can be improved and enhanced significantly.

In a further preferred mode for carrying out the invention, the lock-up position control means of the valve timing control system according to the second aspect of the invention may be so designed that even after the engine is stopped, the lock-up position control means continues to sustain a control quantity fed to the oil supply means during the hold control performed before the engine is stopped.

With the arrangement of the valve timing control system described above, malfunctions in the engine starting operation can positively be suppressed.

In a yet further preferred mode for carrying out the invention, the lock-up position control means of the valve timing control system according to the second aspect of the invention may be so designed that even after the engine is stopped, the lock-up position control means continues to sustain a control quantity which corresponds to a sum of the control quantity fed to the oil supply means during the hold control performed before stoppage of the engine and a predetermined value.

With the arrangement of the valve timing control system described above, the actuator locking performance upon stoppage of the engine can further be improved.

In a still further preferred mode for carrying out the invention, the lock-up position control means of the valve timing control system according to the second aspect of the invention may be so designed as to set a control quantity for the oil supply means after stoppage of the engine to a value obtained by adding periodically at least twice a predetermined value to the control quantity fed to the oil supply means during the hold control performed before the engine is stopped.

With the arrangement of the valve timing control system described above, the actuator locking performance upon stoppage of the engine can equally be improved.

In another mode for carrying out the invention, the predetermined value mentioned above should preferably correspond to a value for correcting deviation of the lock-up position brought about by restorative efforts of the cam shaft.

With the arrangement of the valve timing control system described above, the actuator locking performance upon stoppage of the engine can be improved as well.

In yet another mode for carrying out the invention, the lock-up position control means of the valve timing control system according to the second aspect of the invention should preferably be so designed as to continue to supply a control quantity for realizing a maximum flow on an advanced side to the oil supply means even after the engine has been stopped.

With the arrangement of the valve timing control system described above, the actuator can advantageously be so controlled as to be positively fixed at the lock-up position upon stoppage of the engine.

In still another mode for carrying out the invention, the actual valve timing control means of the valve timing control system according to the second aspect of the invention should preferably be so designed that unless the actuator is retained at the lock-up position upon engine starting, the actual valve timing control means controls the oil supply means for realizing a maximum flow on the advanced side over a predetermined time period from a time point at which the engine is started, to thereby retain the actuator at the lock-up position.

With the arrangement of the valve timing control system described above, the actuator can positively be fixed at the lock-up position upon stoppage of the engine, whereby malfunction which may otherwise be involved in the engine starting operation can be excluded.

In a further mode for carrying out the invention, the predetermined time period mentioned above should preferably correspond to a period extending from an operation starting time point of the engine to a time point at which rotation speed (rpm) of the engine reaches a predetermined rotation speed (rpm).

With the arrangement of the valve timing control system described above, the actuator can positively be fixed at the lock-up position upon starting of the engine with the control overhead as involved being reduced to a necessary minimum.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
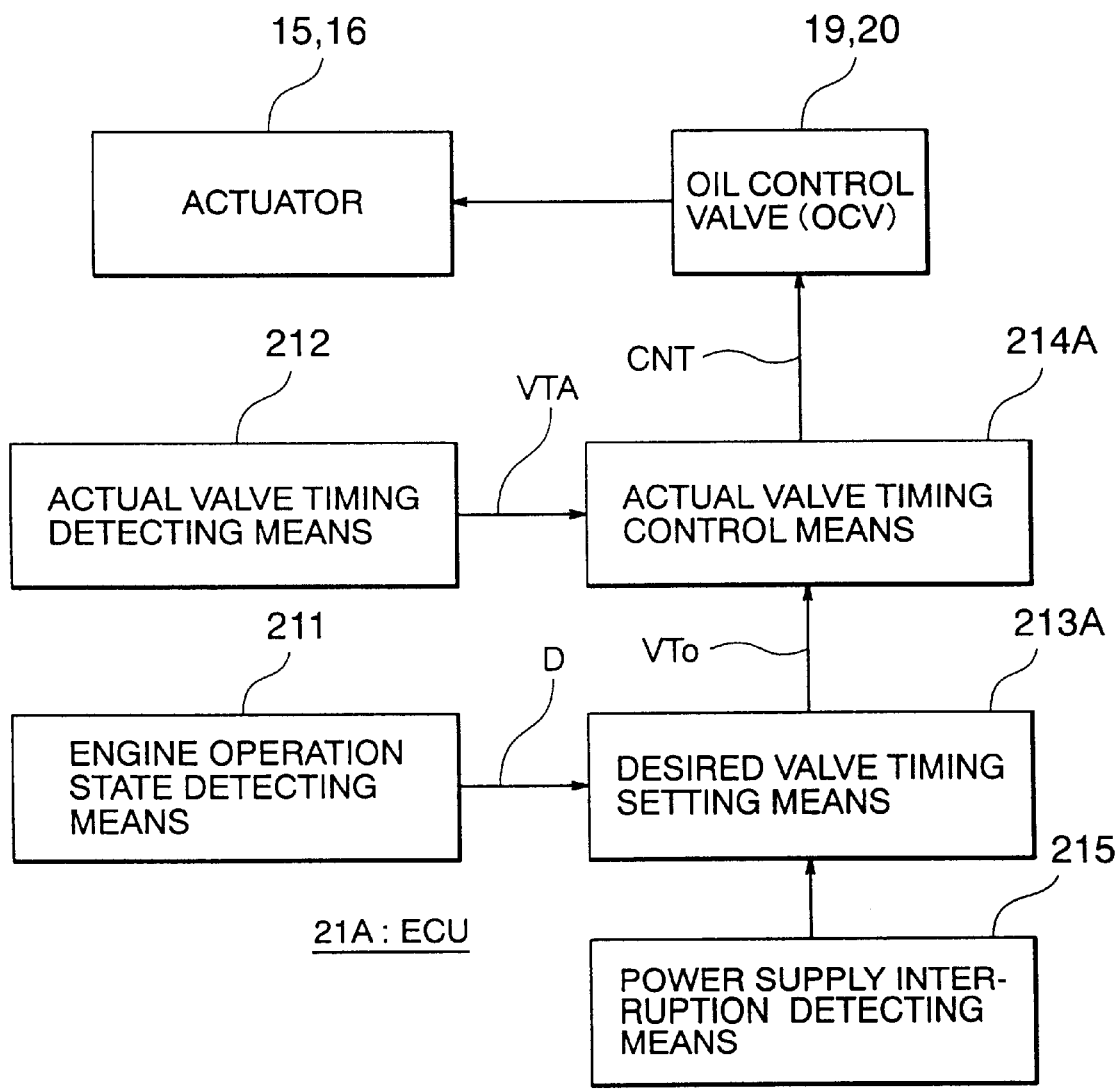
FIG. 1 is a functional block diagram showing generally a configuration of a control unit (ECU) incorporated in a valve timing control system for an internal combustion engine according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

In the following, a valve timing control system for an internal combustion engine according to a first embodiment of the present invention will be described in detail by reference to the drawings.

Figure 7:
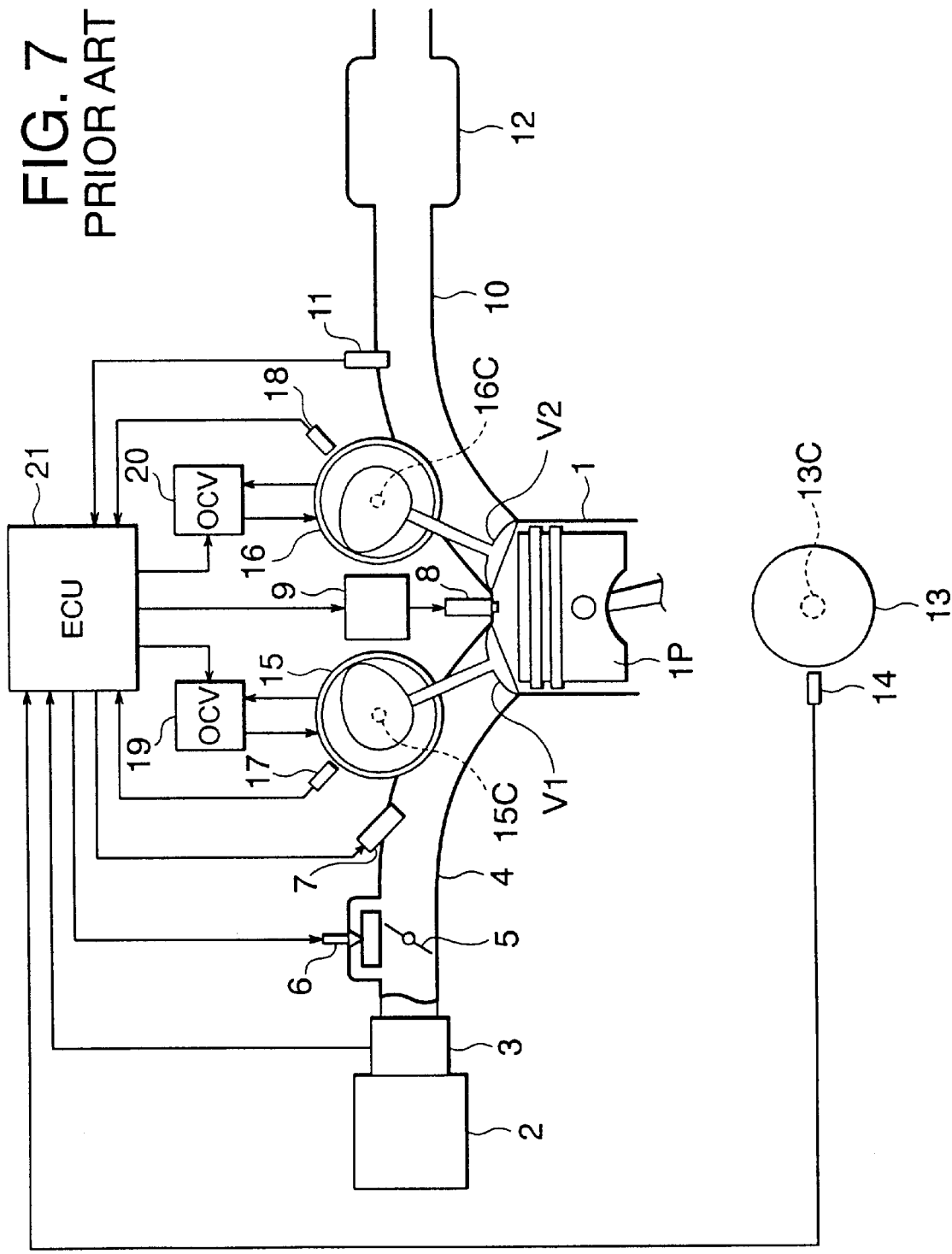
FIG. 7 is a diagram showing generally and schematically a configuration of a conventional valve timing control system of an internal combustion engine to which the teachings of the present invention can be applied.
Figure 8:
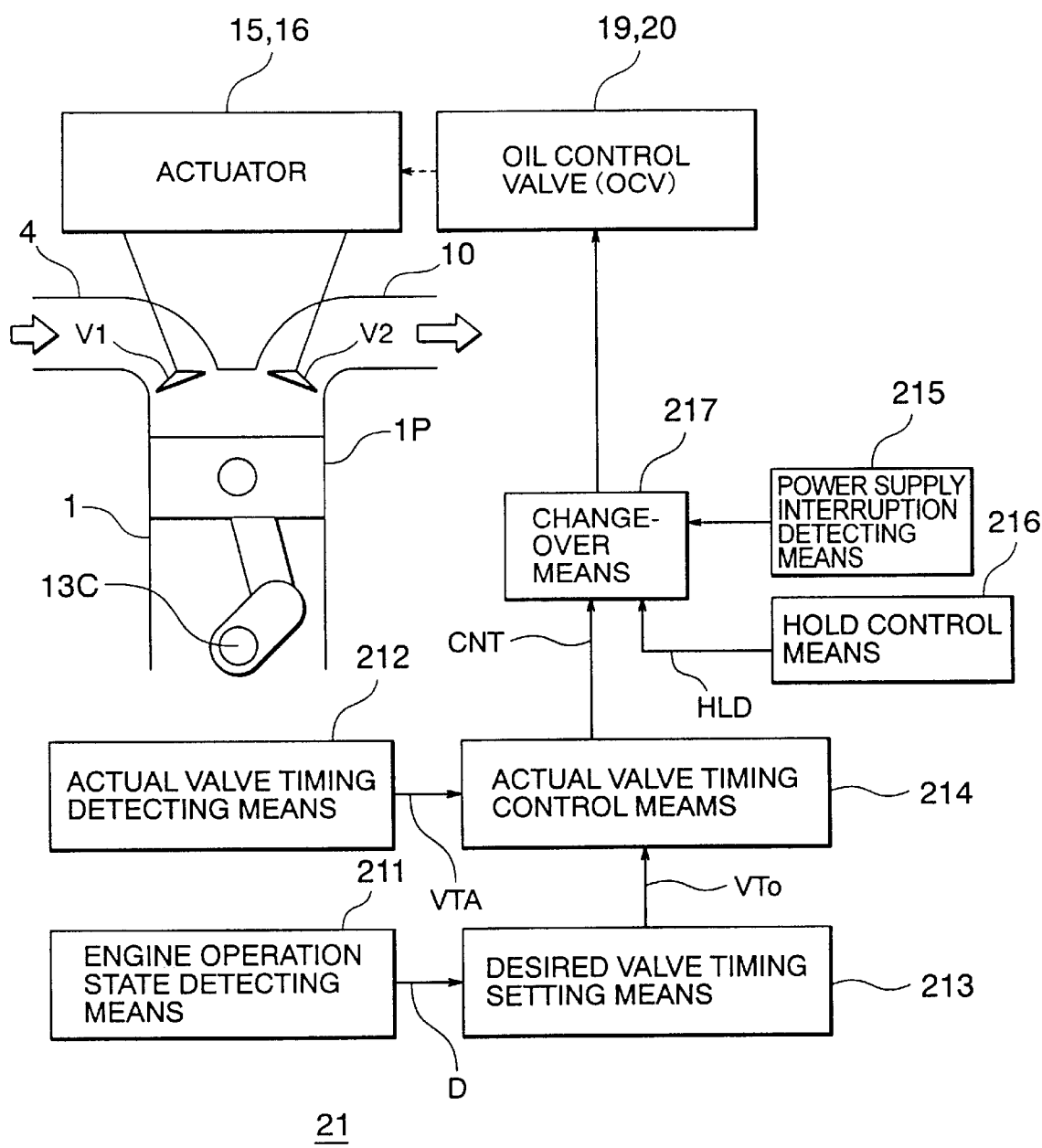
FIG. 8 is a functional block diagram for illustrating generally functional features of the conventional valve timing control system.

FIG. 1 is a functional block diagram showing generally an arrangement of a control means (ECU 21A) for the valve timing control system according to the first embodiment of the invention, wherein components same as or equivalent to those mentioned hereinbefore by reference to FIGS. 7 and 8 are denoted by like reference characters as those used or affixed with "A" and detailed description thereof is omitted.

Parenthetically, the configuration of the whole system according to the first embodiment of the invention is essentially identical with that described hereinbefore by reference to FIG. 7 except for difference in some processing functions of the ECU 21A. Further, the physical structure of the actuator 15; 16 and that of the oil control valve (OCV) 19; 20 are also essentially identical with those described hereinbefore in conjunction with FIGS. 11 to 19.

Figure 9:
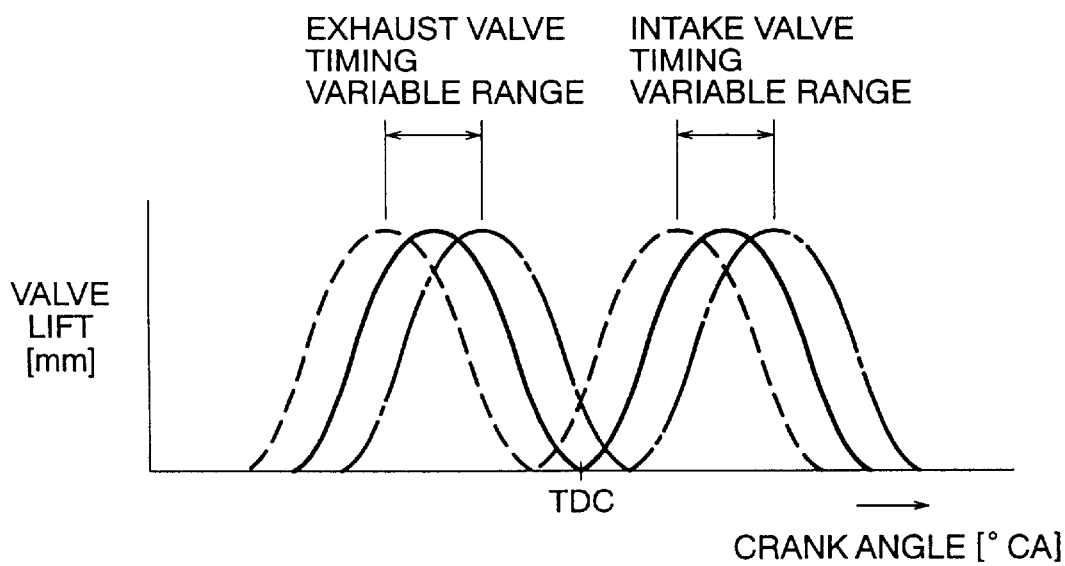
FIG. 9 is a view for generally illustrating relation between crank angles (phases) and valve lifts in the conventional valve timing control system for the internal combustion engine.
Figure 10:
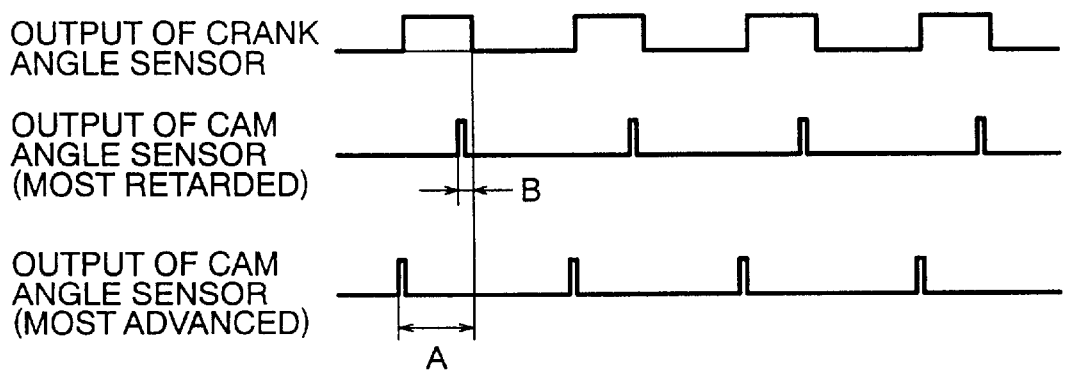
FIG. 10 is a timing chart for illustrating timing or phase relations between an output pulse signal of a crank angle sensor and that of a cam angle sensor in the conventional valve timing control system for the internal combustion engine.
Figure 11:
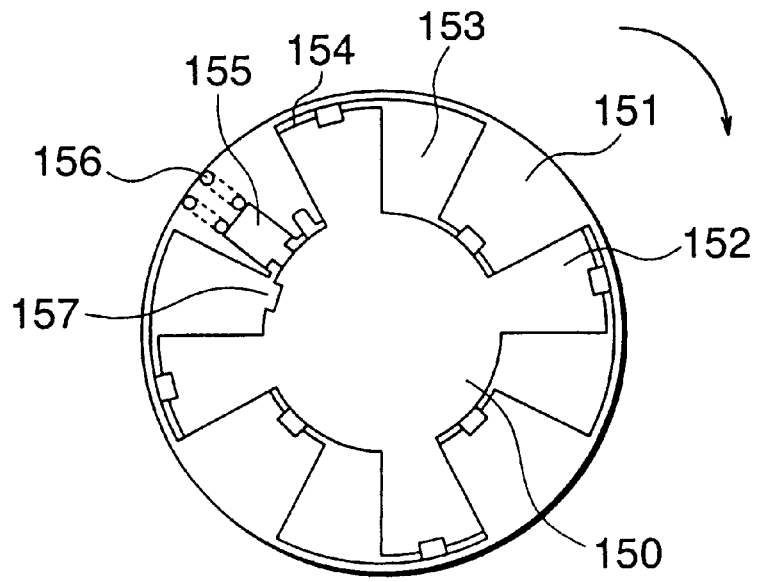
FIG. 11 is a sectional view showing an actuator of the conventional valve timing control system.
Figure 12:
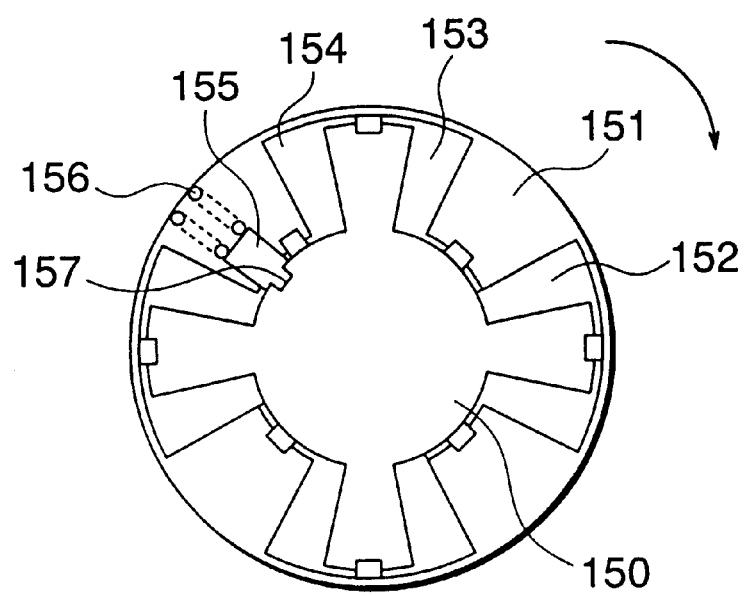
FIG. 12 is a sectional view showing the actuator in a state differing from that shown in FIG. 11.
Figure 13:
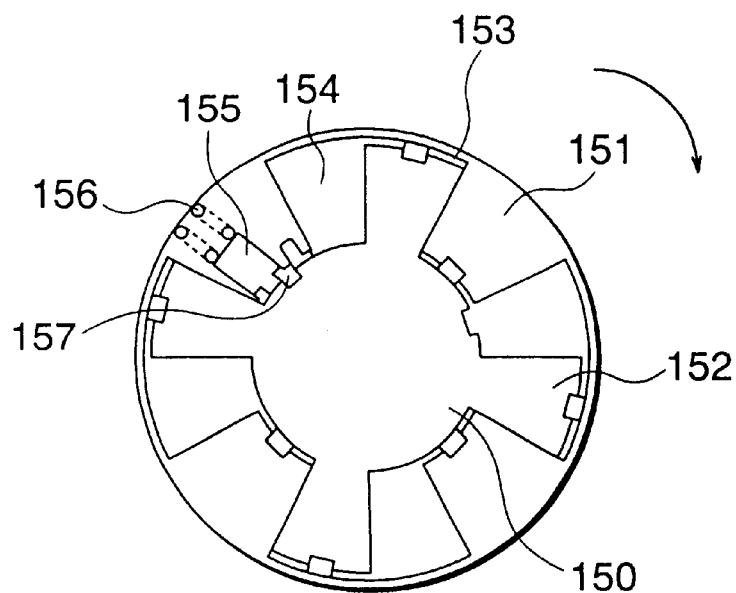
FIG. 13 is a sectional view showing the actuator in yet another operating state.
Figure 14:
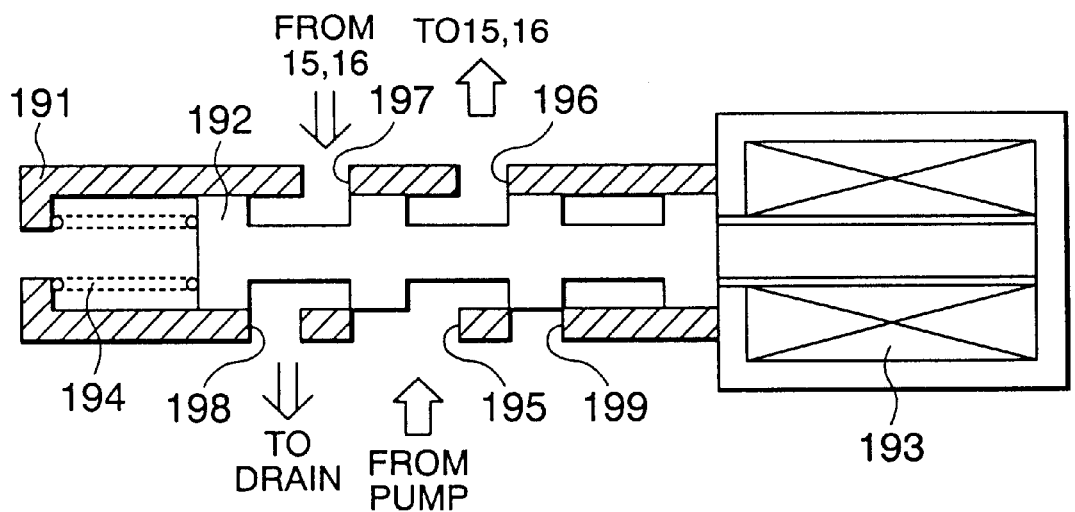
FIG. 14 is a side-elevational sectional view showing a structure of an oil control valve unit incorporated in a conventional valve timing control system to which the teachings of the present invention can be applied.
Figure 15:
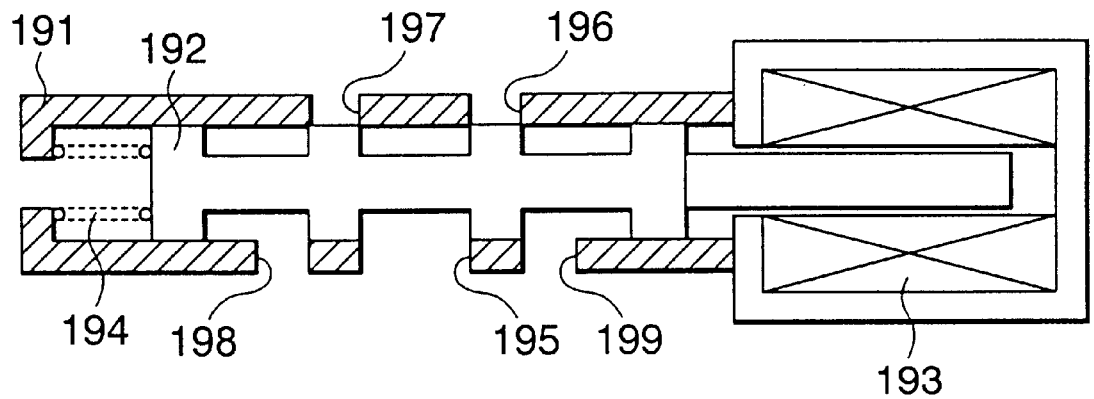
FIG. 15 is a side-elevational sectional view showing the oil control valve unit in an operation state differing from that shown in FIG. 14.
Figure 16:
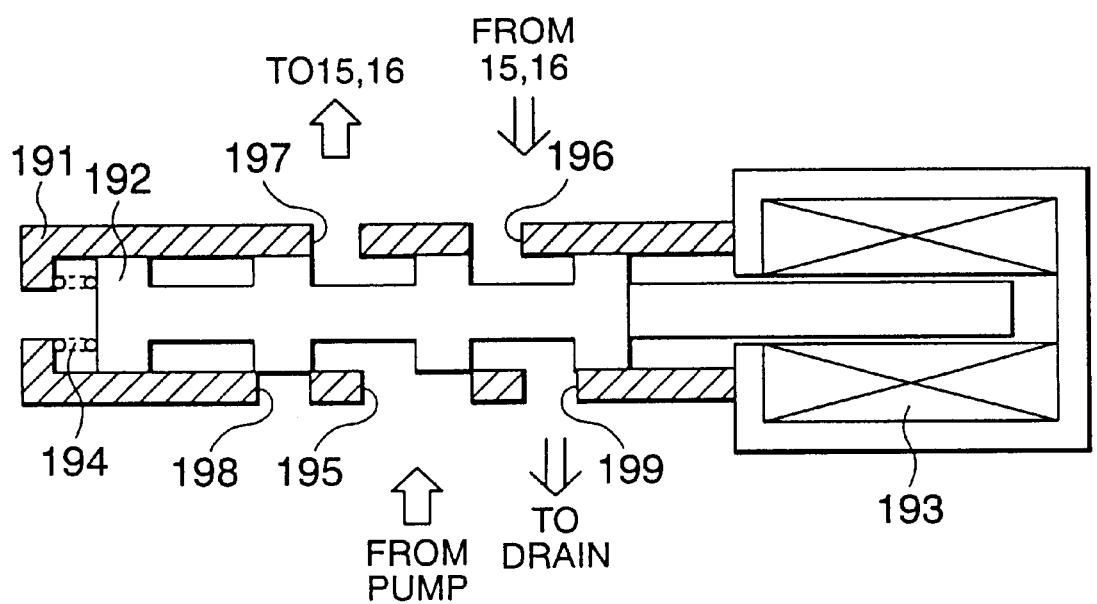
FIG. 16 is a side-elevational sectional view showing the oil control valve unit in yet another operation state.
Figure 17:
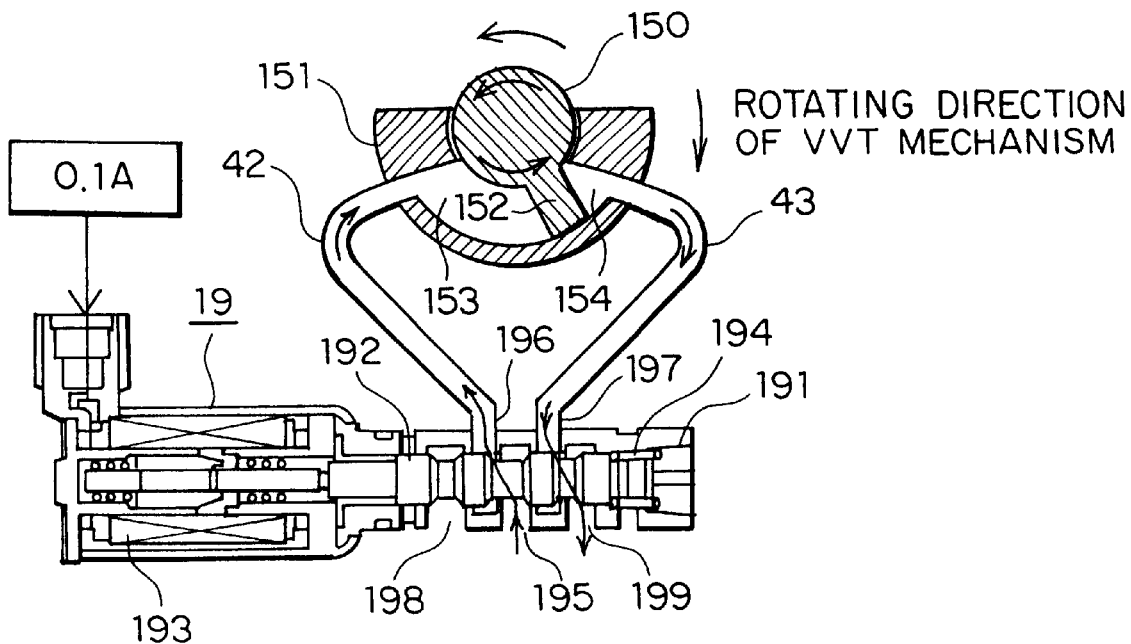
FIG. 17 is a sectional view for illustrating an operation state of the actuator and the oil control valve in the conventional valve timing control system for the internal combustion engine to which the teachings of the present invention can be applied.
Figure 18:
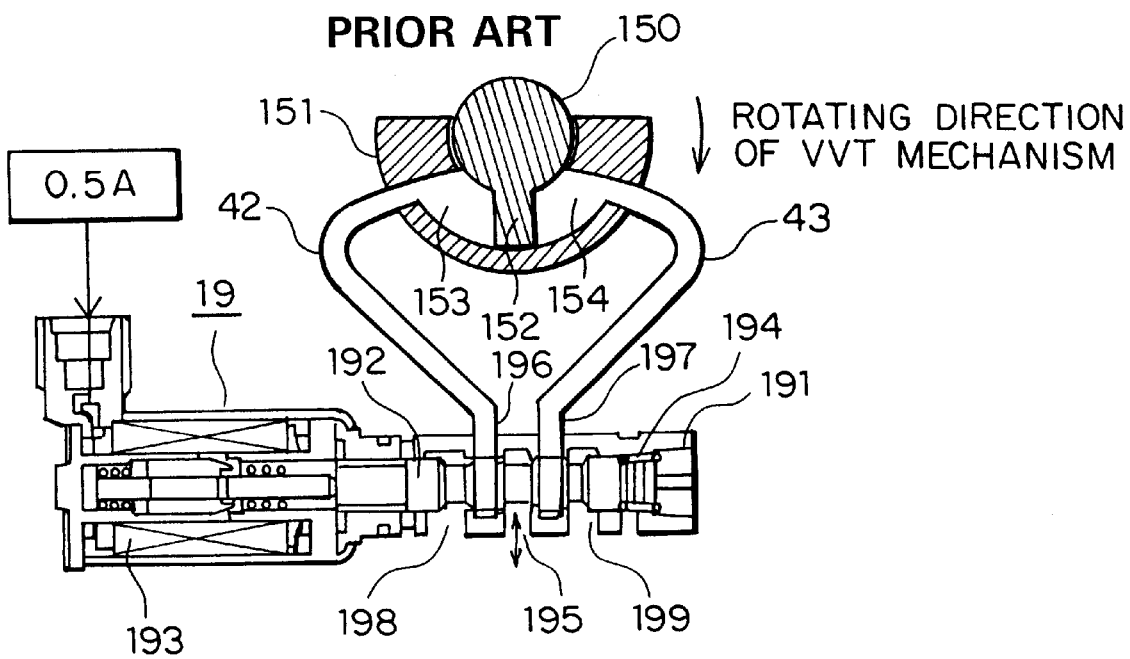
FIG. 18 is a sectional view for illustrating another operation state of the actuator and the oil control valve in the conventional valve timing control system for the internal combustion engine.
Figure 19:
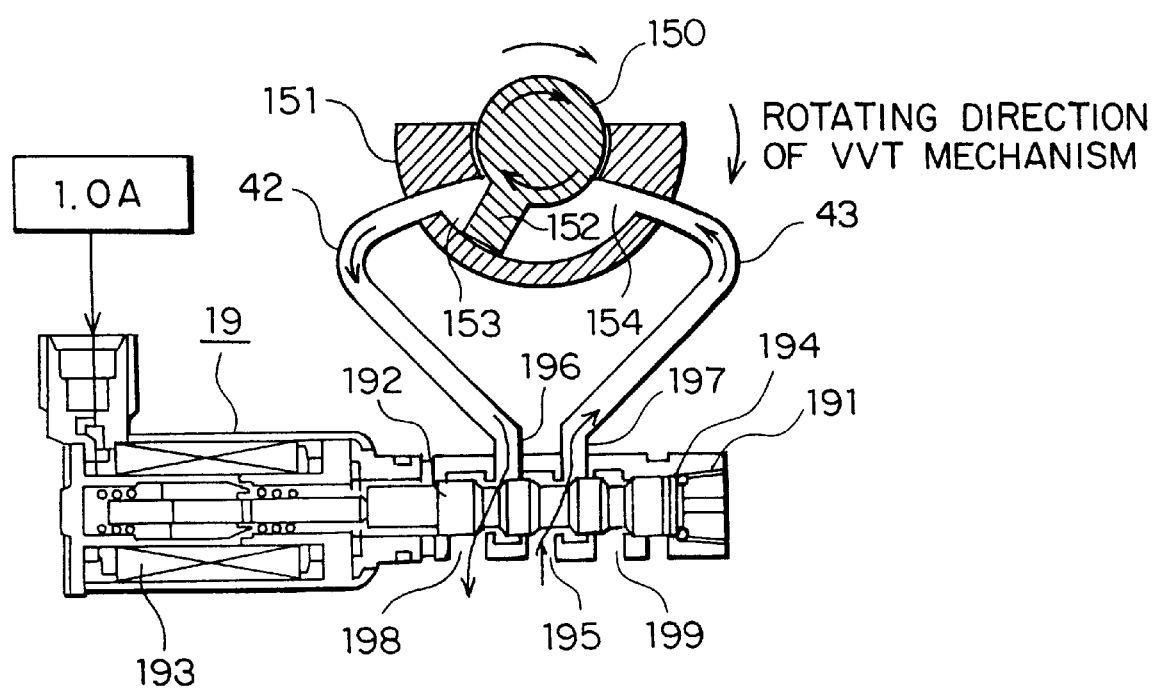
FIG. 19 is a sectional view for illustrating yet another operation state of the actuator and the oil control valve in the conventional valve timing control system for the internal combustion engine.

Additionally, in the valve timing control system now under consideration, the valve timing adjustable or variable ranges for the intake valve and the exhaust valve are same as those illustrated in FIG. 9. Besides, the relations between the output signals of the crank angle sensor 14 and the cam angle sensors 17; 18 are also same as those illustrated in FIG. 10.

Now, referring to FIG. 1, the actuators 15; 16 and the oil control valves (oil supply means) 19; 20 cooperate to constitute the variable valve timing (VVT) mechanism, similarly to the conventional valve timing control system described hereinbefore. The ECU 21A which controls the variable valve timing mechanism includes an engine operation state detecting means 211, an actual valve timing detecting means 212, a desired valve timing setting means 213A, an actual valve timing control means 214A and a power supply interruption detecting means 215.

The desired valve timing setting means 213A is designed to set the valve timing to a target or desired valve timing VTo so that the actuator 15; 16 can be fixed by the locking mechanism in response to detection of the power supply interruption by the power supply interruption detecting means 215 upon stopping of the engine operation.

The actual valve timing control means 214A is designed or programmed to perform the feedback control for the oil control valve 19; 20 over a predetermined time period (e.g. 5 seconds) from the time point at which the power supply interruption detecting means 215 detected the power supply interruption upon engine stoppage so that deviation or difference between the desired valve timing VTo set by the desired valve timing setting means 213A and the actual valve timing VTA detected by the actual valve timing detecting means 212 may disappear.

More specifically, the desired valve timing setting means 213A serves to set the desired valve timing VTo to the lock-up position upon interruption of the power supply while the actual valve timing control means 214A serves to hold or retain the actuator 15; 16 at the lock-up position through the medium of the oil control valve 19; 20 over the predetermined period from the time point when the power supply is interrupted.

Next, by reference to a flow chart shown in FIG. 2, description will be made in concrete of the operations of the power supply interruption detecting means 215, the desired valve timing setting means 213A and the actual valve timing control means 214A in the valve timing control system according to the instant embodiment of the invention shown in FIG. 1. The processing routine illustrated in FIG. 2 is executed by the ECU 21A at every predetermined time interval.

Figure 2:
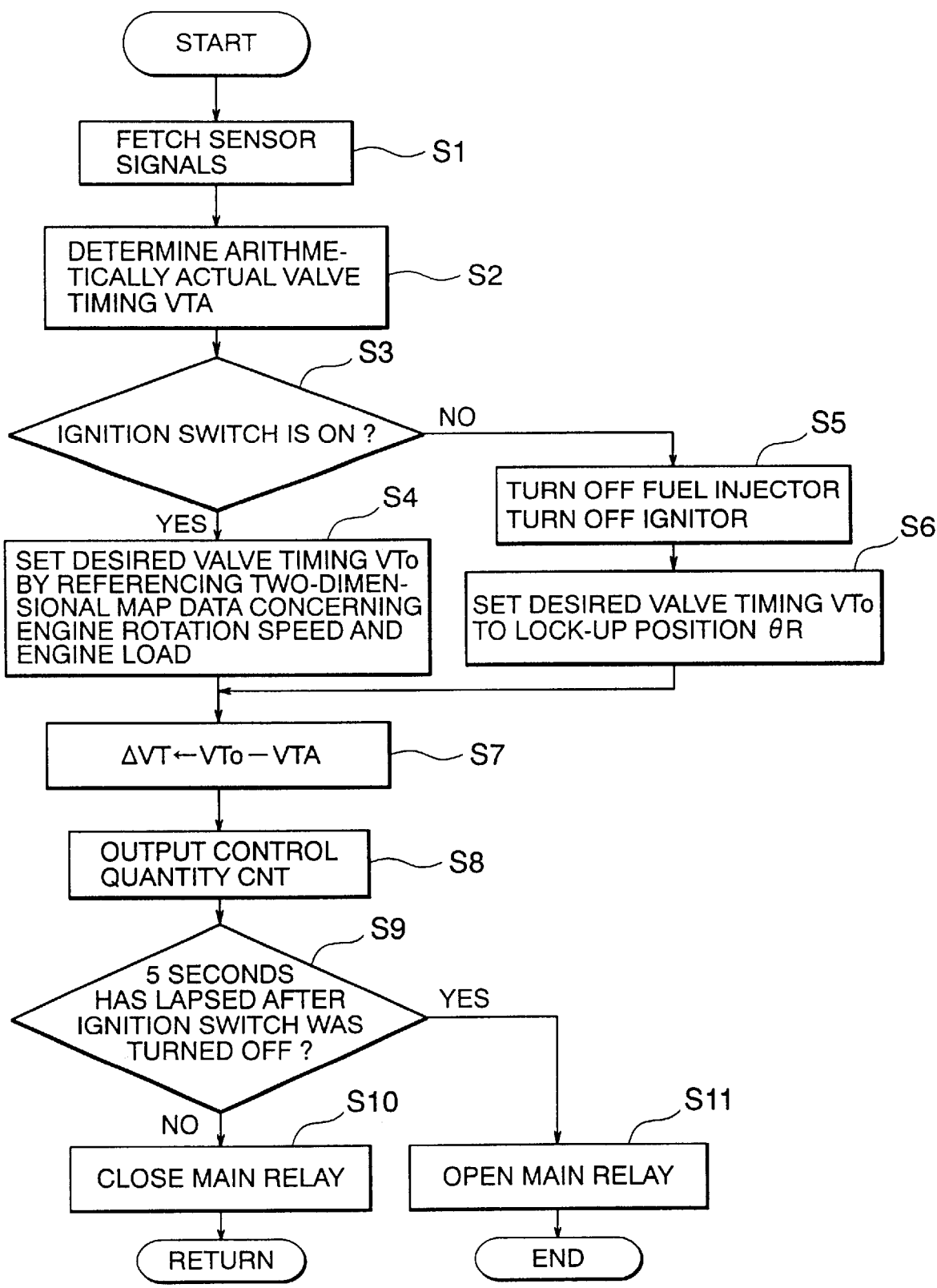
FIG. 2 is a flow chart for illustrating operation of the control unit (ECU) according to the first embodiment of the present invention.

Referring to FIG. 2, the engine operation state detecting means 211 incorporated in the ECU 21A fetches information concerning the engine operation state such as intake air quantity, throttle opening degree, cooling water temperature, engine rotation speed (rpm), valve timings and others from various sensors such as the air-flow sensor 3, the throttle position sensor, the coolant temperature sensor, the crank angle sensor 14, the cam angle sensor 17; 18 and others (refer to FIG. 7) to detect the engine operation state D (step S1).

In succession, an angle of displacement (i.e., relative phase) of the cam shafts 15C and 16C relative to the crank shaft 13C is arithmetically determined in the term of the actual valve timing VTA on the basis of the crank angle signal outputted from the crank angle sensor 14 and the cam angle signals outputted from the cam angle sensor 17; 18 (step S2).

Subsequently, it is decided by the power supply interruption detecting means 215 whether or not the ignition switch is closed (step S3). When decision is made in the step S3 that the ignition switch is closed (i.e., when the decision step S3 results in affirmation "YES"), the detection signal indicating the power-on is inputted to the desired valve timing setting means 213A.

In response to the detection signal mentioned just above, the desired valve timing setting means 213A references the data map or table in which the desired positions determined previously are contained in correspondence to the engine operation states D, respectively, to thereby set the desired valve timing VTo for the ordinary control in conformance with the current engine operation state D (step S4).

On the other hand, when decision is made in the step S3 that the ignition switch is opened (i.e., when the decision step S3 results in negation "NO"), the power supply interruption detecting means 215 inputs the detection signal indicating the power supply interruption to the desired valve timing setting means 213A.

In response to the detection signal mentioned just above, the ECU 21A turns off the fuel injector 7 (see FIG. 7) and the ignitor including the ignition coil 9 (step S5). On the other hand, the desired valve timing setting means 213A stet the desired valve timing VTo to a lock-up position θR (step S6) so that fix the actuator 15; 16 can be fixed at the lock-up position θR by means of the locking mechanism.

Subsequently, the actual valve timing control means 214A arithmetically determines the deviation or difference ΔVT between the desired valve timing VTo and the actual valve timing VTA (step S7) to output the control quantity CNT which conforms to the difference ΔVT in terms of a control current to be supplied to the oil control valve 19; 20 (step S8).

In this way, by carrying out the feedback control of the control quantity (control current) CNT for the oil control valve 19; 20, the actual valve timing control means 214A controls the actuator 15; 16 to be set to the desired valve timing VTo on the basis of the relevant map prepared previously data upon closing of the ignition switch while controlling the actuator 15; 16 to the lock-up position OR when the ignition switch is turned off or opened.

Subsequently, the ECU 21A makes decision as to whether or not a predetermined time period (e.g. 5 seconds) has lapsed since the ignition switch was opened (step S9). When it is decided in the step S9 that the predetermined time period (e.g. 5 seconds) has not lapsed yet (i.e., when the decision step S9 results in "NO"), the main relay is then turned on or closed (step S10), whereon the processing step S1 is resumed.

As a result of this, the main relay serving as the power supply to the ECU 21A is held in a closed state, i.e., on-state, until the time period of five seconds has lapsed since the opening of the ignition switch.

On the other hand, when it is decided in the step S9 that five seconds has lapsed since the ignition switch was opened (i.e., when the decision step S9 results in "Yes"), the main relay is then opened under control of the ECU 21A (step S11), whereon the processing routine shown in FIG. 2 comes to an end.

In this manner, the actuator 15; 16 is so controlled as to be set to the lock-up position over the predetermined time period (e.g. 5 seconds) after stopping of the engine, the actuator 15; 16 can be fixed at the lock-up position by the locking mechanism without fail.

Thus, the cam angle control can be performed smoothly upon the succeeding engine starting operation, whereby such undesirable phenomena as hunching of the rotor 150 (refer to FIGS. 11 to 13, FIGS. 17 to 19) and noise generation can satisfactorily be suppressed in the engine starting operation.

Further, since the lock-up position θR is set by the desired valve timing setting means 213A in response to the detection of the power supply interruption, the change-over means 217 (refer to FIG. 8) becomes unnecessary, which means that the actuator locking performance can be enhanced with a simplified structure.

In the foregoing, the valve timing control system according to the first embodiment of the invention has been described on the presumption that the feedback control is performed by the actual valve timing control means 214A for the oil control valve 19; 20 to be set at the lock-up position after stopping of the engine operation. It should however be understood that the invention is never restricted to the feedback control but an open loop control performed on the basis of a set value θR of the lock-up position may equally be adopted.

Embodiment 2

In the valve timing control system according to the first embodiment of the invention, the actuator 15; 16 is fixed at the lock-up position by performing the feedback control by changing the desired valve timing VTo upon interruption of the power supply. By contrast, in the valve timing control system according to a second embodiment of the invention, a change-over means and a lock-up position control means operative in response to the power supply interruption are additionally employed.

Figure 3:
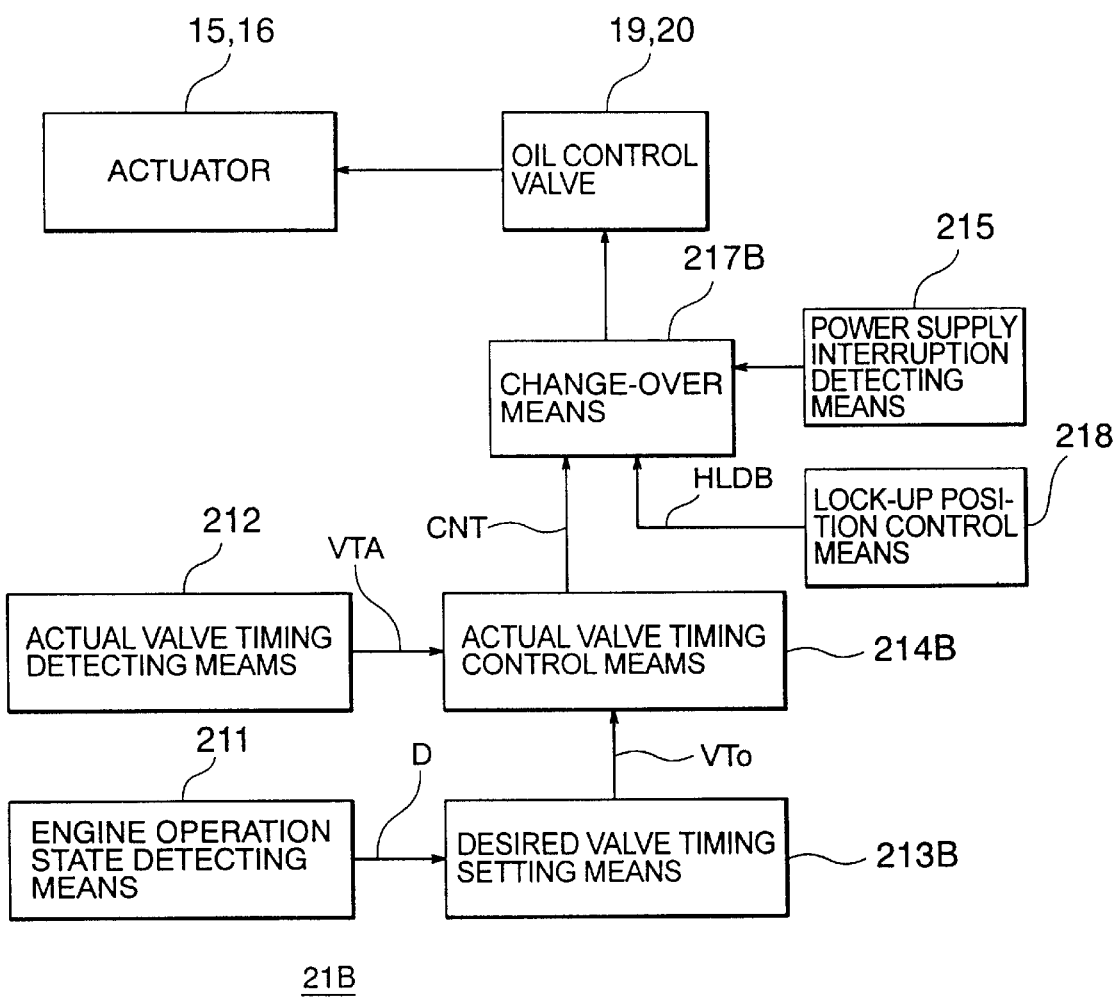
FIG. 3 is a functional block diagram showing generally a configuration of a control unit (ECU) according to a second embodiment of the present invention.

FIG. 3 is a functional block diagram showing generally an arrangement of a control means (ECU 21B) in the valve timing control system according to the second embodiment of the invention, which system employs a lock-up position control means. In FIG. 3, components same as or equivalent to those mentioned hereinbefore by reference to FIGS. 1 and 8 are denoted by like reference characters as those used or affixed with "B" and detailed description thereof is omitted.

Referring to FIG. 3, the ECU 21B further includes a lock-up position control means 218 and a change-over means 217B in addition to the engine operation state detecting means 211, the actual valve timing detecting means 212, the desired valve timing setting means 213B, the actual valve timing control means 214B and the power supply interruption detecting means 215.

The lock-up position control means 218 is designed to supply continuously a control quantity (i.e., hold current) HLDB effective for the hold control before the engine operation stoppage (i.e., before the ignition switch is opened) to the oil control valve 19; 20 for a predetermined time period (e.g. 5 seconds) so that the actuator 15; 16 can be held at the lock-up position after the engine has been stopped (i.e., after interruption of the power supply).

On the other hand, the change-over means 217B is designed to change over the control quantity for the oil control valve 19; 20 between the value for the ordinary control (performed by the actual valve timing control means 214B) upon power-on of the engine and the value for the hold control (performed by the lock-up position control means 218) upon power-off of the engine in dependence on the detection signal (indicating power on/off) outputted from the power supply interruption detecting means 215.

In other words, the change-over means 217B selects the ordinary control quantity supplied from the actual valve timing control means 214B upon power-on of the engine while selecting the lock-up position control quantity supplied from the lock-up position control means 218 upon power-off of the engine to thereby retain or hold the actuator 15; 16 at the lock-up position for a predetermined time period (e.g. 5 seconds) from the time point when the power supply is interrupted.

Figure 4:
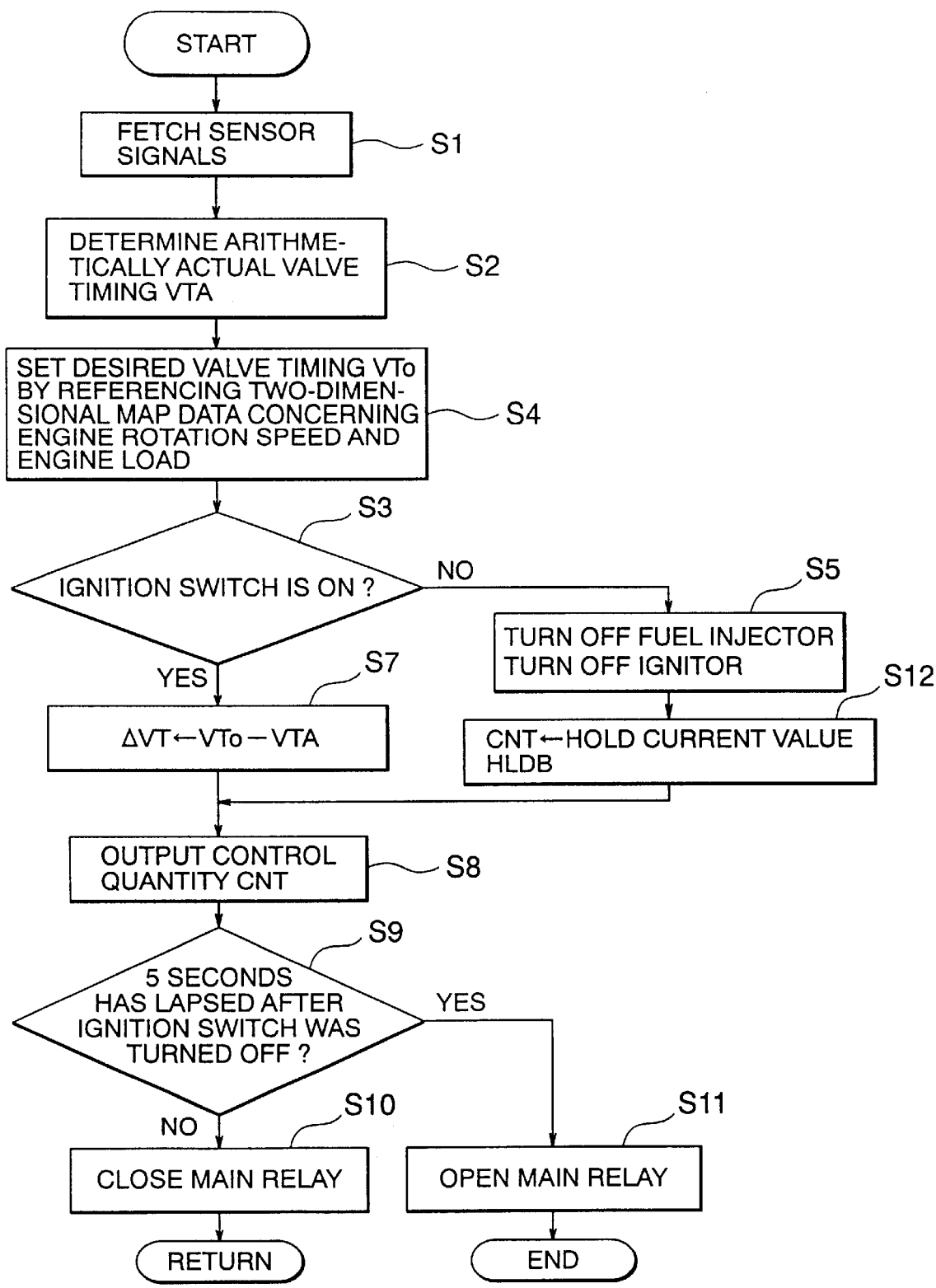
FIG. 4 is a flow chart for illustrating operation of the control unit (ECU) according to the second embodiment of the present invention.

Next, by reference to a flow chart shown in FIG. 4, description will be directed to operations of the power supply interruption detecting means 215, the lock-up position control means 218 and the change-over means 217B of the valve timing control system according to the second embodiment of the present invention.

Referring to FIG. 4, the processing procedure shown therein differs from that shown in FIG. 2 only in the respects that the sequential order of the steps S3 and S4 is reversed and that a step S12 is inserted instead of the step S6.

In the procedure now of concern, in succession to the sensor signal (operation state D) fetch processing in the step S1 and the arithmetic processing for determining the actual valve timing VTA in the step S2, the desired valve timing VTo is set (step S4), which is then followed by the step S3 where decision is made as to whether or not the ignition switch is closed or on.

When it is decided in the step S3 that the ignition switch is closed (i.e., when the decision step S3 results in "YES"), the arithmetic processing for determining the valve timing difference ΔVT (step S7) and the control quantity CNT output processing (step S8) are executed, similarly to the processing procedure described previously.

By contrast, when it is decided in the step S3 that the ignition switch is opened (i.e., when the decision step S3 results in "NO"), the turn-off processing of the fuel injector 7 and the ignitor is first executed in a step S5, which is then followed by a step S12 in which the lock-up position control means 218 sets as the control quantity CNT the hold current value HLDB effective before the ignition switch is opened, in order to retain or hold the actuator 15; 16 at the lock-up position (step S12).

On the other hand, the change-over means 217B outputs the hold current value HLDB supplied from the lock-up position control means 218 as the control quantity CNT in response to the power supply interruption (i.e., turn-off of the ignition switch) in a step S8 to electrically energize the oil control valve 19; 20.

Subsequently, At the time point when it is decided in the step S9 that the predetermined time period (e.g. 5 seconds) has lapsed, the main relay is opened under control of the ECU 21A (step S11), whereon the processing routine shown in FIG. 4 comes to an end.

In this manner, in the case where the engine is stopped, starting from the lock-up position holding state prevailing before the engine stoppage, the hold current HLDB is sustained over a predetermined time period (e.g. 5 seconds) after the opening of the ignition switch, whereby the actuator 15; 16 is fixed at the lock-up position by means of the locking mechanism.

Thus, the cam angle control can be performed smoothly upon the succeeding engine starting operation by suppressing such undesirable phenomena as hunching of the rotor 150 (refer to FIGS. 11 to 13, FIGS. 17 to 19) and noise generation in the engine starting operation, as in the case of the system described previously.

Embodiment 3

In the valve timing control system according to the second embodiment of the invention, the control quantity CNT for the oil control valve 19; 20 upon power-off of the engine is set to the hold current value HLDB which has been effective before the power supply is broken. A third embodiment of the present invention is directed to the valve timing control system in which the control quantity CNT is set to a current value which corresponds to a maximum flow on the advanced side.

Figure 5:
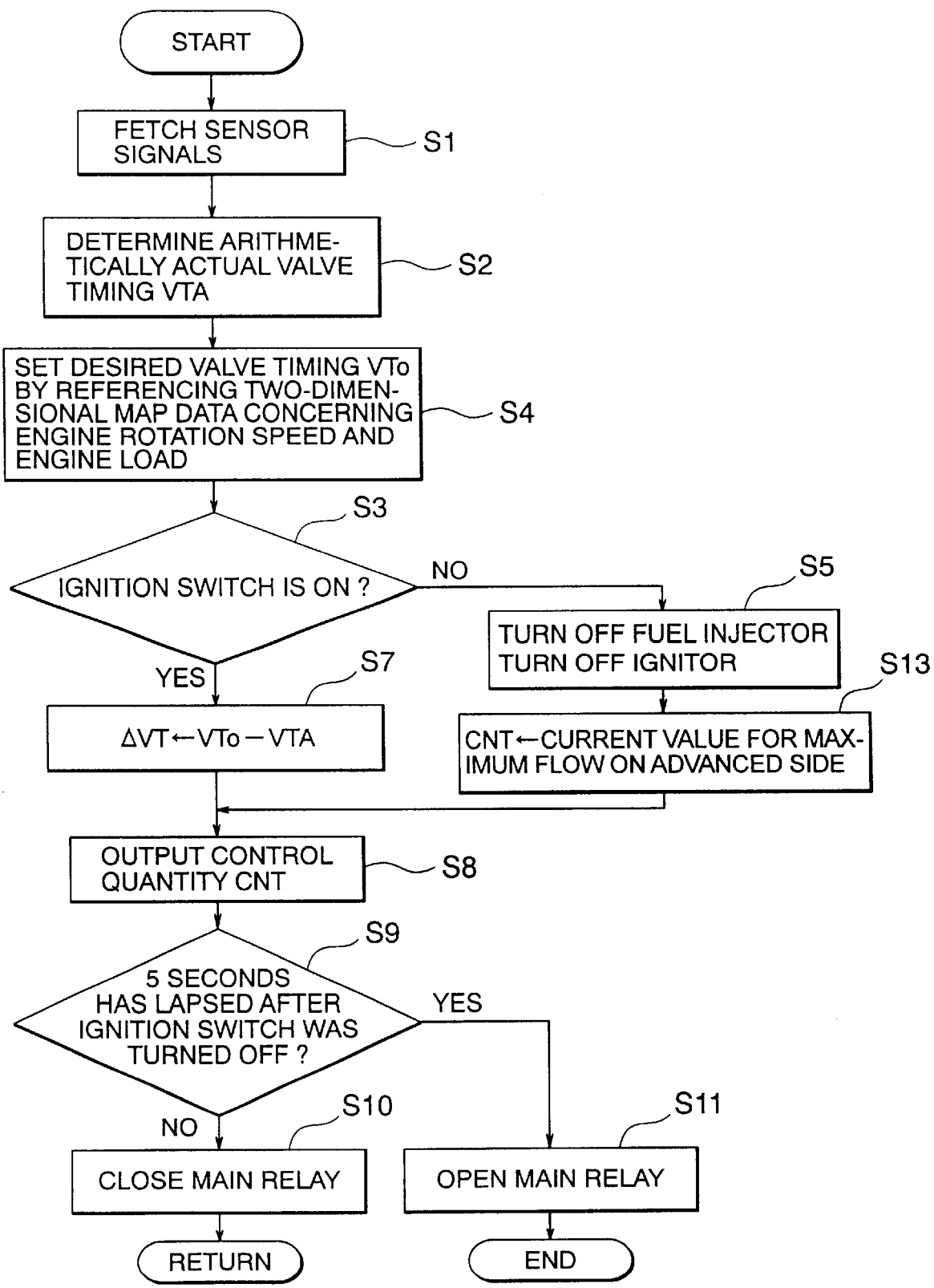
FIG. 5 is a flow chart for illustrating operation of a control unit (ECU) according to a third embodiment of the present invention.

FIG. 5 is a flow chart for illustrating operation of the valve timing control system according to the third embodiment of the invention, which system is designed to set the control quantity CNT upon power-off of the engine (i.e., when the engine operation is stopped) to a current value which corresponds to a maximum flow on the advanced side. In the figure, the processing steps same as or equivalent to those described hereinbefore by reference to FIGS. 2 and 4 are denoted by like reference characters and detailed description thereof is omitted.

Figure 6:
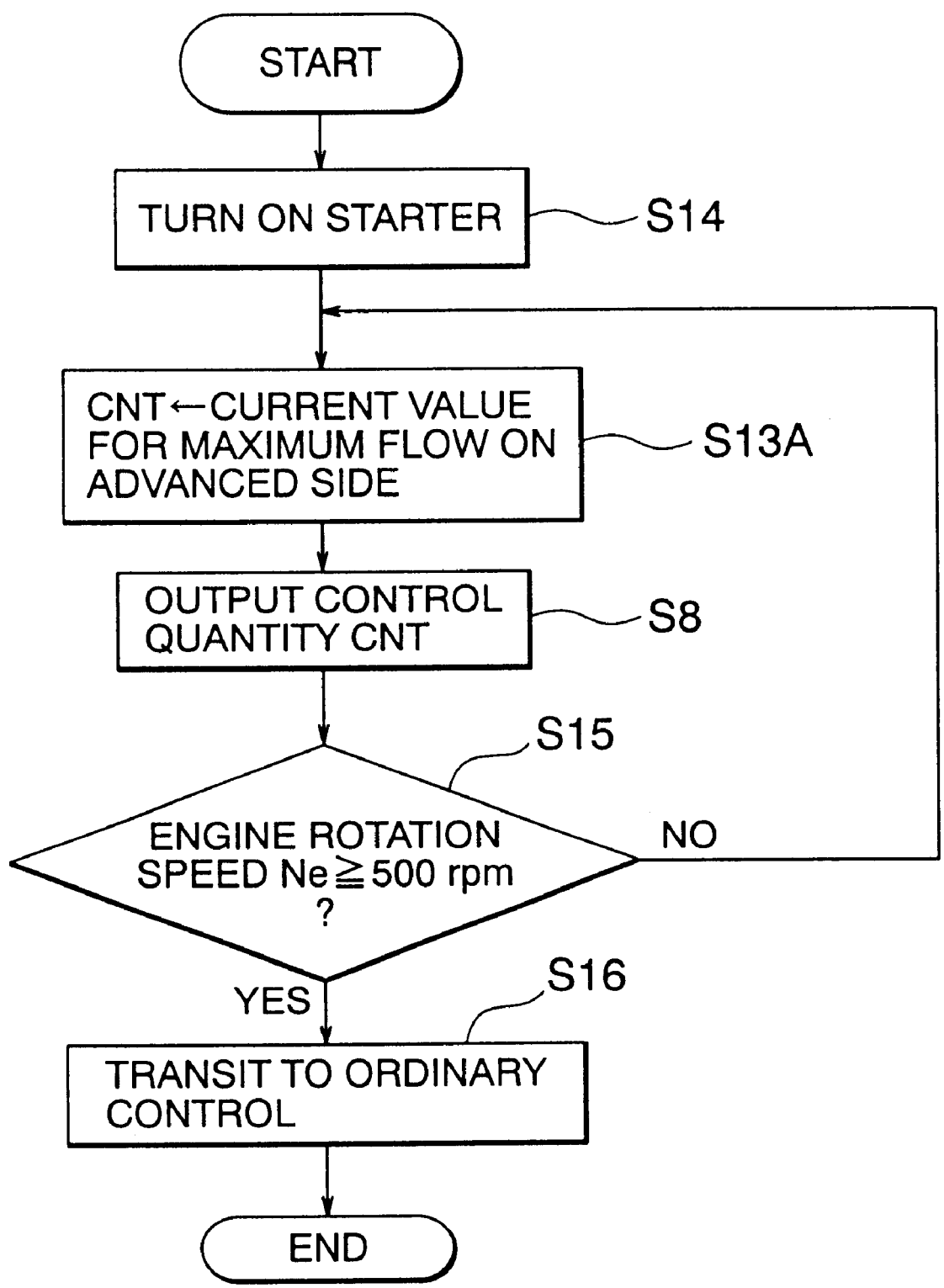
FIG. 6 is a flow chart for illustrating further operation of the control unit (ECU) according to the third embodiment of the present invention.

Further, FIG. 6 is a flow chart for illustrating operation of the valve timing control system according to the instant embodiment in the engine starting operation mode. Also in this figure, processing steps same as or equivalent to those described hereinbefore by reference to FIGS. 2, 4 and 5 are denoted by like reference characters as those used hereinbefore, being affixed with "A" as the case may be. Thus, repeated description of these processing steps will be unnecessary.

Further, the general configuration of the ECU 21B is substantially same as that shown in FIG. 3 except for some difference in respect to the functions of the lock-up position control means 218.

More specifically, the lock-up position control means 218 according to the instant embodiment of the invention is adapted to supply to the oil control valve 19; 20 a control quantity for setting a maximum current (e.g. 1 A (ampere)) for advancing the actuator 15; 16 continuously over a predetermined time period (e.g. 5 seconds) after the engine is stopped, to thereby cause the actuator 15; 16 to be shifted toward the most advanced position. In this manner, it can be ensured that the actuator 15; 16 is fixedly set at the lock-up position by the locking mechanism with high probability when the engine is started again.

On the other hand, unless the actuator 15; 16 is set at the lock-up position when the engine is started, the actual valve timing control means 214B supplies the maximum current to the oil control valve 19; 20 for causing the actuator 15; 16 to be shifted toward the most advanced position so that the actuator 15; 16 can be fixed at the lock-up position.

In FIG. 5, the processing procedure illustrated therein differs from that illustrated in FIG. 4 only in the respect that a step S13 is inserted in place of the step S12.

Referring to FIG. 5, when it is decided in the step S3 that the ignition switch is opened (i.e., when the decision step S3 results in "NO"), the maximum control current is set as the control quantity CNT in succession to the step S5 for thereby shifting the actuator 15; 16 toward the most advanced position (step S13).

Subsequently, the control quantity CNT is outputted (step S8) and the main relay is opened after the predetermined time (e.g. 5 seconds) has lapsed (step S11), whereon the processing routine shown in FIG. 5 comes to an end.

On the other hand, when the actuator 15; 16 is not fixed at the lock-up position by means of the locking mechanism upon or after the stopping of the engine but is set at a position other than the lock-up position, the ECU 21B executes the processing routine shown in FIG. 6 when the engine is started again.

Now, referring to FIG. 6, when the power supply to the starter is turned on in the engine starting operation (step S14), the lock-up position control means 218 sets the control quantity CNT (current value for electric energization) for the oil control valve 19; 20 to the maximum value (step S13A), to thereby energize electrically the oil control valve 19; 20 (step S8).

The supply of the control quantity CNT is continued as the engine rotation speed increases until a sufficient amount of oil has been supplied for allowing the oil remaining in the retarding hydraulic chamber 153 (see FIG. 11) to be drained efficiently.

By increasing the distance of displacement of the rotor 150 (see FIGS. 11 to 13 and FIGS. 17 to 19) by cranking and moving the rotor 150 to the lock-up position, the lock pin 155 is caused to engage in the locking recess 157 to thereby lock the actuator 15; 16.

In succession, decision is made in a step S15 as to whether the engine rotation speed (rpm) Ne has reached or increased beyond a predetermined engine rotation speed (500 rpm). When the engine rotation speed (rpm) Ne is lower than 500 rpm (i.e., when the decision step S15 results in "No"), then the step S13A is resumed.

By contrast, when the engine rotation speed (rpm) Ne is equal to or higher than 500 rpm (i.e., when the decision step S15 results in "YES"), then the engine operation is regarded as having left the starting mode and the control is changed over to the ordinary control (step S16), whereon the processing procedure shown in FIG. 6 is terminated.

At this juncture, it should be added that the time taken for the engine to reach the engine rotation speed (rpm) Ne equal to or higher than 500 rpm may vary in dependence on various factors such as the temperature of cooling water and others.

In this manner, even when the actuator 15; 16 is not fixed at the lock-up position but is set to other given position than the lock-up position of the time of starting the engine operation, the actuator 15; 16 can be displaced toward the most advanced position by controlling the oil control valve 19; 20 such that the maximum flow is realized on the advanced side when the starter is switched on, whereby the enhanced locking performance can be ensured.

In other words, possibility of the actuator 15; 16 being fixed at the lock-up position by means of the locking mechanism can be increased.

Thus, the cam angle control can be performed smoothly upon engine starting operation, whereby such undesirable phenomena as hunching of the rotor 150 (refer to FIGS. 11 to 13, FIGS. 17 to 19) and accompanying noise generation can effectively be suppressed.

Further, at the time point at which the engine rotation speed (rpm) Ne reaches the predetermined engine rotation speed (500 rpm), the ordinary control is resumed (step S16). By virtue of this feature, the control for setting fixedly the actuator 15; 16 to the lock-up position upon engine starting can be reduced to a necessary minimum, which in turn means that the ordinary control effective for the engine can be used to the best advantage.

Embodiment 4

In the valve timing control system according to the third embodiment of the present invention, it is presumed, by way of example, that the lock-up position is set at a mid or intermediate position other than the most advanced position (or the most retarded position).

In the valve timing control system according to a fourth embodiment of the invention, the lock-up position is set at the most advanced position (or the most retarded position). With this arrangement, substantially same advantageous effects as described above can be obtained.

Modifications

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, description has been made on the presumption that the teachings of the present invention are applied to the case where the change-over means 217B and the lock-up position control means 218 (refer to FIG. 3) which respond to the power supply interruption detecting means 215 are employed. However, invention can equally be applied to the case where the desired valve timing setting means 213A (refer to FIG. 1) which is arranged to respond to the power supply interruption detecting means 215 is adopted. In this case, the actuator 15; 16 can equally be fixed at the lock-up position by means of the locking mechanism by controlling the oil control valve 19; 20 so that the maximum flow is realized on the advanced side, even when the actuator 15; 16 is set at any other position than the lock-up position at the time of starting the engine operation.

Further, although it has been described that the lock-up position control means 218 of the system according to the second embodiment of the present invention is so arranged as to set the hold current value HLDB effective before stoppage of the engine as the control quantity CNT after the engine is stopped, a value resulting from addition of a predetermined value to the hold current value HLDB may be used as the control quantity CNT. In this case, the actuator locking performance at the time of stopping the engine operation can further be enhanced.

Furthermore, the lock-up position control means 218 may be so arranged as to set as the control quantity CNT after stoppage of the engine operation a value resulting from periodical addition of a predetermined value at least twice to the hold current HLDB with a view to correcting deviation from the lock-up position brought about by restorative efforts of the cam shaft 15C; 16C. With the arrangement mentioned above, the actuator locking performance can further be enhanced.

Thus, it should be understood that all suitable modifications and equivalents may be resorted to, falling within the spirit and scope of the invention.

What is claimed is:

1. A valve timing control system for an internal combustion engine, comprising:

sensor means for detecting operating states of an internal combustion engine;

an intake valve driving cam shaft and an exhaust valve driving cam shaft for driving intake and exhaust valves, respectively, of said internal combustion engine in synchronism with rotation of a crank shaft of said engine;

actuator means operatively connected to at least one of said intake valve driving cam shaft and said exhaust valve driving cam shaft for changing open/close timings of the relevant valve(s);

actual valve timing detecting means for detecting an actual valve timing of at least one of said intake and exhaust valves;

oil supply means for supplying a hydraulic pressure for driving said actuator means;

a locking mechanism for retaining said actuator means at a lock-up position within a driving range within which said actuator means can be driven;

an unlocking mechanism for releasing said locking mechanism in response to a predetermined hydraulic pressure supplied from said oil supply means; and control means for controlling the hydraulic pressure supplied from said oil supply means to said actuator means in dependence on said operating states of said internal combustion engine to thereby change a relative phase of said cam shaft relative to said crank shaft;

said control means including:

power supply interruption detecting means for detecting a time point when electric power supply is interrupted upon stoppage of said engine;

desired valve timing setting means for setting a desired valve timing on the basis of said engine operation state; and actual valve timing control means for driving said actuator means so that said actual valve timing coincides with said desired valve timing, wherein said actual valve timing control means is designed to control said oil supply means over a predetermined time period extending from said power supply interruption time point in response to a result of detection of said power supply interruption detecting means for thereby allowing said actuator means to be retained at said lock-up position.

2. A valve timing control system for an internal combustion engine according to claim 1, wherein said actual valve timing control means is designed to hold said actuator at said lock-up position by performing a feedback control.

3. A valve timing control system for an internal combustion engine according to claim 1, wherein said desired valve timing setting means is designed to set said desired valve timing at said lock-up position in response to the result of detection of said power supply interruption detecting means.

4. A valve timing control system for an internal combustion engine according to claim 1, wherein said actual valve timing control means is so designed that unless said actuator is retained at said lock-up position upon engine starting, said actual valve timing control means controls said oil supply means for realizing a maximum flow on the advanced side over a predetermined time period extending from a time point at which said engine is started, to thereby retain said actuator at said lock-up position.

5. A valve timing control system for an internal combustion engine according to claim 4, wherein said predetermined time period corresponds to a period extending from an operation starting time point of said engine to a time point at which rotation speed (rpm) of said engine reaches a predetermined rotation speed (rpm).

6. A valve timing control system for an internal combustion engine, comprising:

sensor means for detecting operating states of an internal combustion engine;

an intake valve driving cam shaft and an exhaust valve driving cam shaft for driving intake and exhaust valves, respectively, of said internal combustion engine in synchronism with rotation of a crank shaft of said engine;

actuator means operatively connected to at least one of said intake valve driving cam shaft and said exhaust valve driving cam shaft for changing open/close timings of the relevant valve(s);

actual valve timing detecting means for detecting an actual valve timing of at least one of said intake and exhaust valves;

oil supply means for supplying a hydraulic pressure for driving said actuator means;

a locking mechanism for retaining said actuator means at a lock-up position within a driving range within which said actuator means can be driven;

an unlocking mechanism for releasing said locking mechanism in response to a predetermined hydraulic pressure supplied from said oil supply means; and control means for controlling the hydraulic pressure supplied from said oil supply means to said actuator means in dependence on said operating states of said internal combustion engine to thereby change a relative phase of said cam shaft relative to said crank shaft;

said control means including:

power supply interruption detecting means for detecting a time point when electric power supply is interrupted upon stoppage of said engine;

desired valve timing setting means for setting a desired valve timing on the basis of said engine operation state; and actual valve timing control means for driving said actuator means so that said actual valve timing coincides with said desired valve timing, wherein said control means further includes lock-up position control means for controlling said oil supply means so as to hold said actuator means at said lock-up position; and change-over means for changing over control of said oil supply means in response to result of detection of said power supply interruption detecting means, and wherein said change-over means is designed to select an ordinary control performed by said actual valve timing control means upon power-on of said engine while selecting a lock-up position control performed by said lock-up position control means upon interruption of power supply to said engine to thereby hold said actuator means at said lock-up position over a predetermined time period from said power supply interruption time point.

7. A valve timing control system for an internal combustion engine according to claim 6, wherein said lock-up position control means is so designed that even after said engine is stopped, said lock-up position control means continues to sustain a control quantity fed to said oil supply means during the hold control performed before said engine is stopped.

8. A valve timing control system for an internal combustion engine according to claim 6, wherein said lock-up position control means is so designed that even after said engine is stopped, said lock-up position control means continues to sustain a control quantity which corresponds to a sum of the control quantity fed to said oil supply means during the hold control performed before stoppage of said engine and a predetermined value.

9. A valve timing control system for an internal combustion engine according to claim 6, wherein said lock-up position control means is designed to set a control quantity for said oil supply means after stoppage of said engine to a value obtained by adding periodically at least twice a predetermined value to the control quantity fed to said oil supply means during the hold control performed before said engine is stopped.

10. A valve timing control system for an internal combustion engine according to claim 8, wherein said predetermined value corresponds to a value for correcting deviation of said actual valve timing and said lock-up position brought about by reaction of driving torque of said cam shaft.

11. A valve timing control system for an internal combustion engine according to claim 6, wherein said lock-up position control means is designed to continue to supply a control quantity for realizing a maximum flow on an advanced side to said oil supply means even after said engine has been stopped.

12. A valve timing control system for an internal combustion engine according to claim 6, wherein said actual valve timing control means is so designed that unless said actuator is retained at said lock-up position upon engine starting, said actual valve timing control means controls said oil supply means for realizing a maximum flow on the advanced side over a predetermined time period extending from a time point at which said engine is started, to thereby retain said actuator at said lock-up position.

13. A valve timing control system for an internal combustion engine according to claim 12, wherein said predetermined time period corresponds to a period extending from an operation starting time point of said engine to a time point at which rotation speed (rpm) of said engine reaches a predetermined rotation speed (rpm).

* * * * *